US011974341B2

(12) United States Patent
Kumar et al.

(10) Patent No.: US 11,974,341 B2
(45) Date of Patent: Apr. 30, 2024

(54) TRAFFIC VERIFICATION MEASUREMENTS FOR SPLIT BEARER WIRELESS COMMUNICATION

(71) Applicant: QUALCOMM Incorporated, San Diego, CA (US)

(72) Inventors: Rajeev Kumar, San Diego, CA (US); Xipeng Zhu, San Diego, CA (US); Shankar Krishnan, San Diego, CA (US); Aziz Gholmieh, Del Mar, CA (US); Ozcan Ozturk, San Diego, CA (US); Punyaslok Purkayastha, San Diego, CA (US); Umesh Phuyal, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/404,865

(22) Filed: Aug. 17, 2021

(65) Prior Publication Data

US 2022/0060925 A1 Feb. 24, 2022

Related U.S. Application Data

(60) Provisional application No. 63/067,183, filed on Aug. 18, 2020.

(51) Int. Cl.
*H04W 76/15* (2018.01)
*H04L 43/0829* (2022.01)
(Continued)

(52) U.S. Cl.
CPC ......... *H04W 76/15* (2018.02); *H04L 43/0829* (2013.01); *H04L 43/0888* (2013.01);
(Continued)

(58) Field of Classification Search
CPC ......... H04W 28/0242; H04W 28/0236; H04W 28/06; H04W 76/15; H04W 28/08; H04W 28/085; H04L 43/0829; H04L 43/0888
See application file for complete search history.

(56) References Cited

U.S. PATENT DOCUMENTS

2015/0351079 A1* 12/2015 Himayat ............... H04W 28/08
370/329
2016/0353457 A1* 12/2016 Park ..................... H04B 7/0417
(Continued)

OTHER PUBLICATIONS

"3rd Generation Partnership Project, Technical Specification Group Radio Access Network, NR, Layer 2 Measurements (Release 16)", Draft, R2-2002000, 3rd Generation Partnership Project (3GPP), Mobile Competence Centre, 650, Route Des Lucioles, F-06921 Sophia-Antipolis Cedex, France, Mar. 11, 2020 (Mar. 11, 2020), XP051864625, 20 Pages, URL: https://ftp.3gpp.org/tsg_ran/WG2_RL2/TSGR2_109_e/Docs/R2-2002000.zip [Retrieved on Mar. 11, 2020], Paragraph [4.1.1.1]-paragraph [4. 1. 1.3. 1] paragraph [4.1.1.5]-paragraph [4.2.1].

(Continued)

*Primary Examiner* — Omer S Mian
(74) *Attorney, Agent, or Firm* — Procopio, Cory, Hargreaves & Savitch

(57) ABSTRACT

A method, a computer-readable medium, and an apparatus are provided for wireless communication at a network node having a split bearer configuration with a user equipment (UE). The network node measures, at a primary node (MN) or a secondary node (SN), a data burst statistic for the network node, the data burst statistic being based on at least one of a burst level throughput or a packet loss measurement for a data burst between the UE and the MN based on a first bearer in the split bearer configuration or between the UE and the SN based on a second bearer in the split bearer configuration. The network node provides the data burst statistic from the network node to at least one of the MN or a core network component.

27 Claims, 13 Drawing Sheets

(51) Int. Cl.
H04L 43/0888 (2022.01)
H04W 28/02 (2009.01)
H04W 28/06 (2009.01)

(52) U.S. Cl.
CPC ... *H04W 28/0236* (2013.01); *H04W 28/0242* (2013.01); *H04W 28/06* (2013.01)

(56) References Cited

U.S. PATENT DOCUMENTS

| | | | |
|---|---|---|---|
| 2018/0035436 A1* | 2/2018 | Sharma | H04W 72/085 |
| 2018/0255545 A1* | 9/2018 | Futaki | H04W 24/10 |
| 2018/0279142 A1* | 9/2018 | Mustajarvi | H04L 43/55 |
| 2019/0098640 A1 | 3/2019 | Holakouei et al. | |
| 2020/0236567 A1* | 7/2020 | Li | H04W 24/10 |
| 2020/0404466 A1* | 12/2020 | Chiaverini | H04M 15/8061 |

OTHER PUBLICATIONS

"3rd Generation Partnership Project, Technical Specification Group Services and System Aspects, Management and Orchestration, 5G Performance Measurements (Release 16)", Draft, 3GPP TS 28.552, V16.2.0 (Jun. 2019), 28552-G20, 3rd Generation Partnership Project (3GPP), Mobile Competence Centre, 650, Route Des Lucioles, F-06921 Sophia-Antipolis Cedex, France, vol. SA WG5, Jun. 7, 2019 (Jun. 7, 2019), XP051753435, 98 Pages, URL: https://www.3gpp.org/ftp/tsg%5Fsa/WG5%5FTM/TSGS5%5F125/SA%5F84. [Retrieved on Jun. 7, 2019]. col. 3.2-col. 5. 1. 1.3.

CATT: "L2 Measurement Modifications for Dual Connectivity", 3GPP Draft, 3GPP TSG.RAN WG2 #87, R2-143526, 36314_CR_yyyy_(REL-12)_R2-143526, L2 Measurement Modifications for Dual Connectivity, 3rd Generation Partnership Project (3GPP), Mobile Competence Centre, 650, Route Des Lucioles, vol. RAN WG2, No. Dresden, Germany, Aug. 18, 2014-Aug. 22, 2014, Aug. 17, 2014 (Aug. 17, 2014), XP050794520, 15 Pages, URL: http://www.3gpp.org/ftp/Meetings_3GPP_SYNC/RAN2/Docs/. [Retrieved on Aug. 17, 2014], Paragraph [4.1.4]-Paragraph [4.1.8.2].

International Search Report and Written Opinion—PCT/US2021/046544—ISA/EPO—dated Nov. 30, 2021.

Samsung: "L2 Measurements in Dual Connectivity", 3GPP Draft, 3GPP TSG RAN WG2 #87, R2-143784, 3rd Generation Partnership Project (3GPP), Mobile Competence Centre, 650, Route Des Lucioles, F-06921 Sophia-Antipolis Cedex, France, vol. RAN WG2, No. Dresden, Germany, Aug. 18, 2014-Aug. 22, 2014, Aug. 17, 2014 (Aug. 17, 2014), XP050794722, 6 Pages, Retrieved from the Internet: URL: http://www.3gpp.org/ftp/Meetings_3GPP_SYNC/RAN2/Docs/. [Retrieved on Aug. 17, 2014] The Whole Document.

* cited by examiner

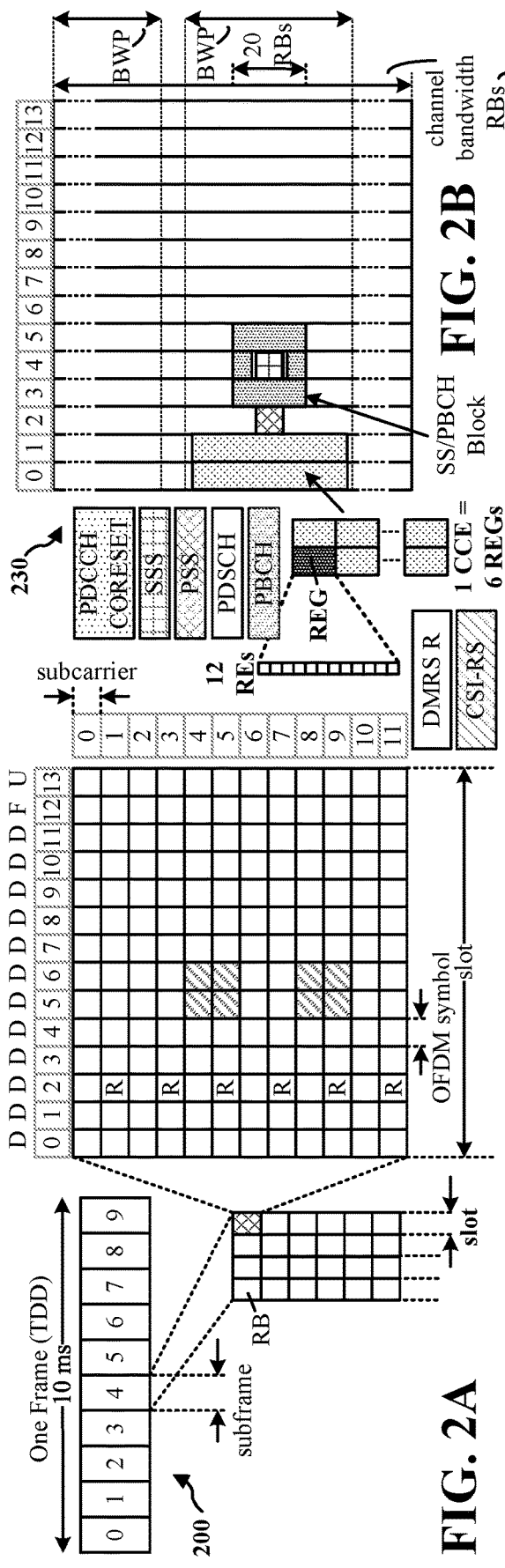
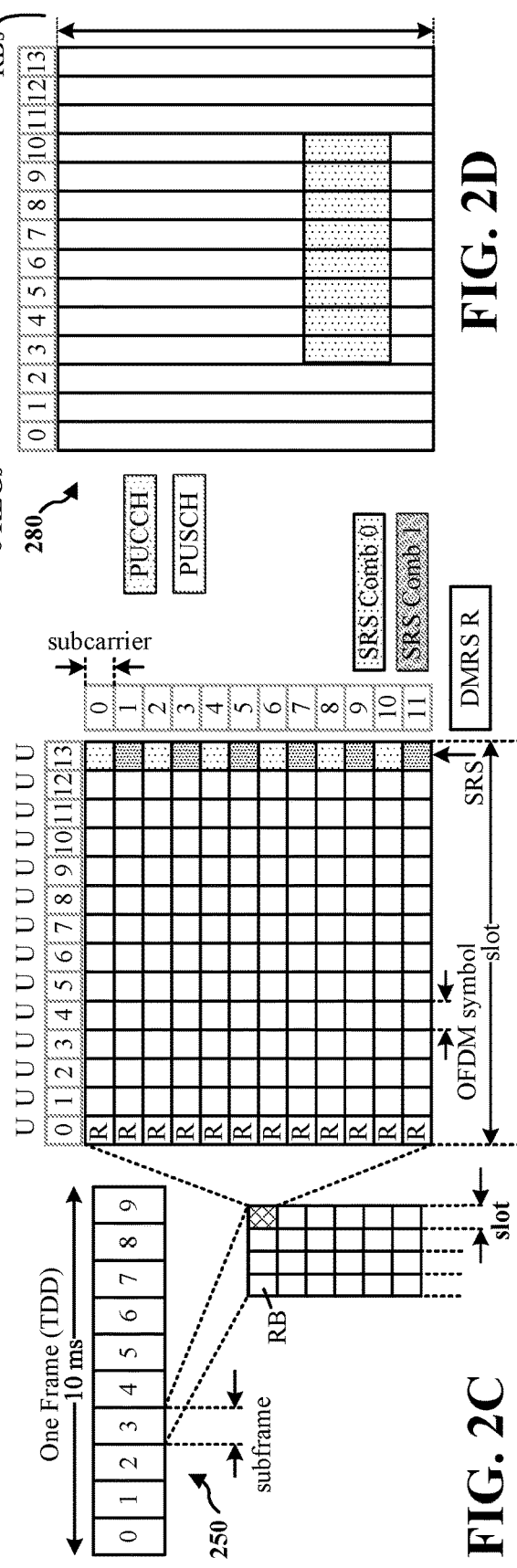
FIG. 2A   FIG. 2B   FIG. 2C   FIG. 2D

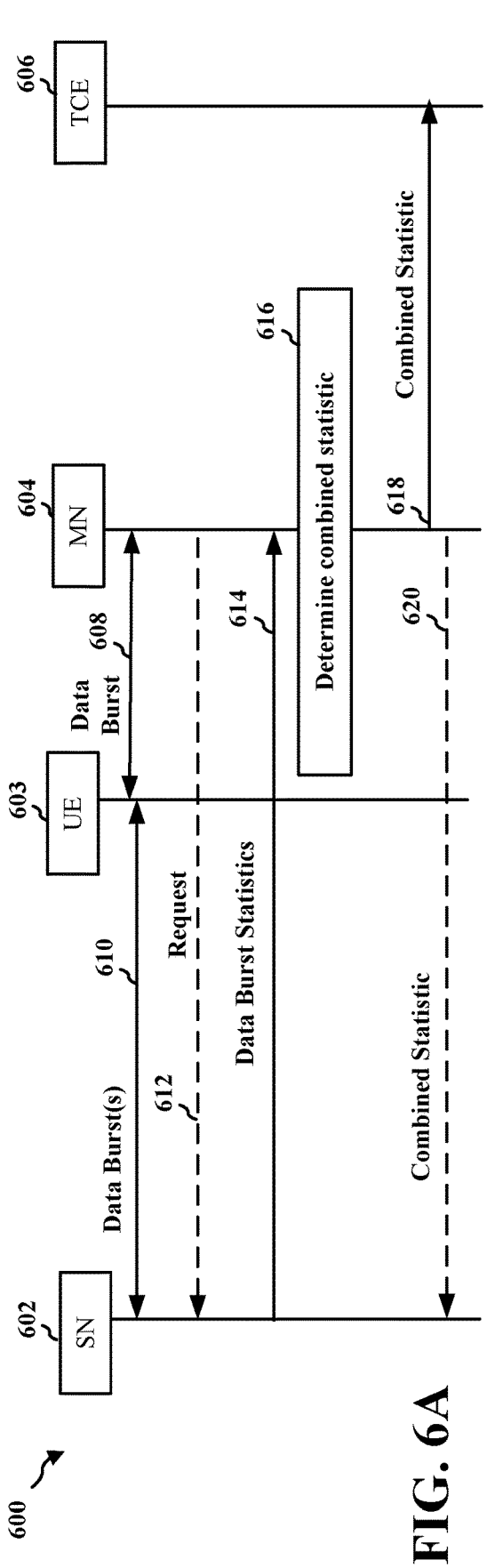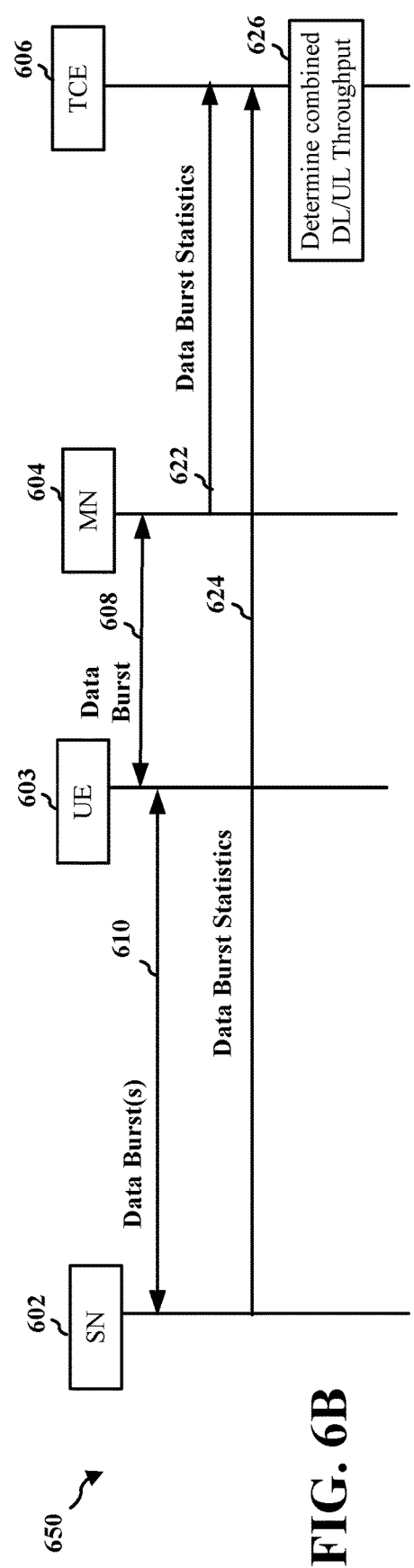
FIG. 6A
FIG. 6B

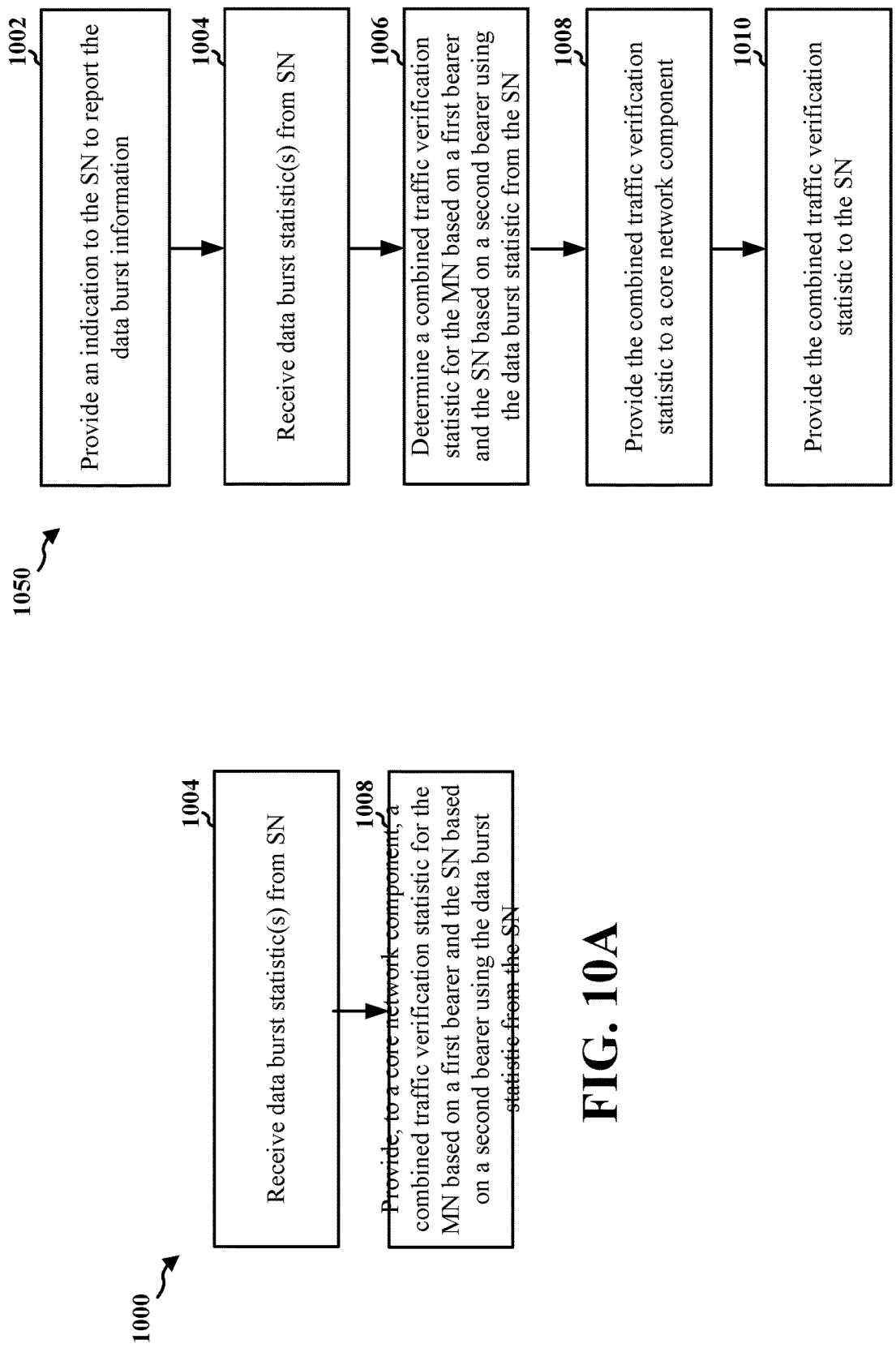

TRAFFIC VERIFICATION MEASUREMENTS FOR SPLIT BEARER WIRELESS COMMUNICATION

CROSS REFERENCE TO RELATED APPLICATION(S)

This application claims the benefit of and priority to U.S. Provisional Application Ser. No. 63/067,183, entitled "Traffic Verification Measurements For Split Bearer Wireless Communication" and filed on Aug. 18, 2020, which is expressly incorporated by reference herein in its entirety.

TECHNICAL FIELD

The present disclosure relates generally to communication systems, and more particularly, to wireless communication including a split bearer.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In another aspect of the disclosure, a method, a computer-readable medium, and an apparatus are provided for wireless communication at a network node having a split bearer configuration for a user equipment (UE). The apparatus measures, at a primary node (MN) or a secondary node (SN), a data burst statistic for the network node, the data burst statistic being based on at least one of a burst level throughput or a packet loss measurement for a data burst between the UE and the MN based on a first bearer in the split bearer configuration or between the UE and the SN based on a second bearer in the split bearer configuration. The apparatus provides the data burst statistic from the network node to at least one of the MN or a core network component.

In an aspect of the disclosure, a method, a computer-readable medium, and an apparatus are provided for wireless communication based on a split bearer configuration with an MN on a first bearer and an SN on a second bearer. The apparatus receives, at the MN, a data burst statistic from an SN. The apparatus determines provides, to a core network component, a combined traffic verification statistic for the MN based on the first bearer and the SN based on the second bearer using the data burst statistic from the SN.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIG. 6A illustrates an example communication for split bearer communication including the determination of traffic verification statistics by the MN.

FIG. 6B illustrates an example communication for split bearer communication including the determination of traffic verification statistics by a core network component.

FIGS. 10A and 10B is flowcharts of methods of wireless communication.

DETAILED DESCRIPTION

Figure 1:
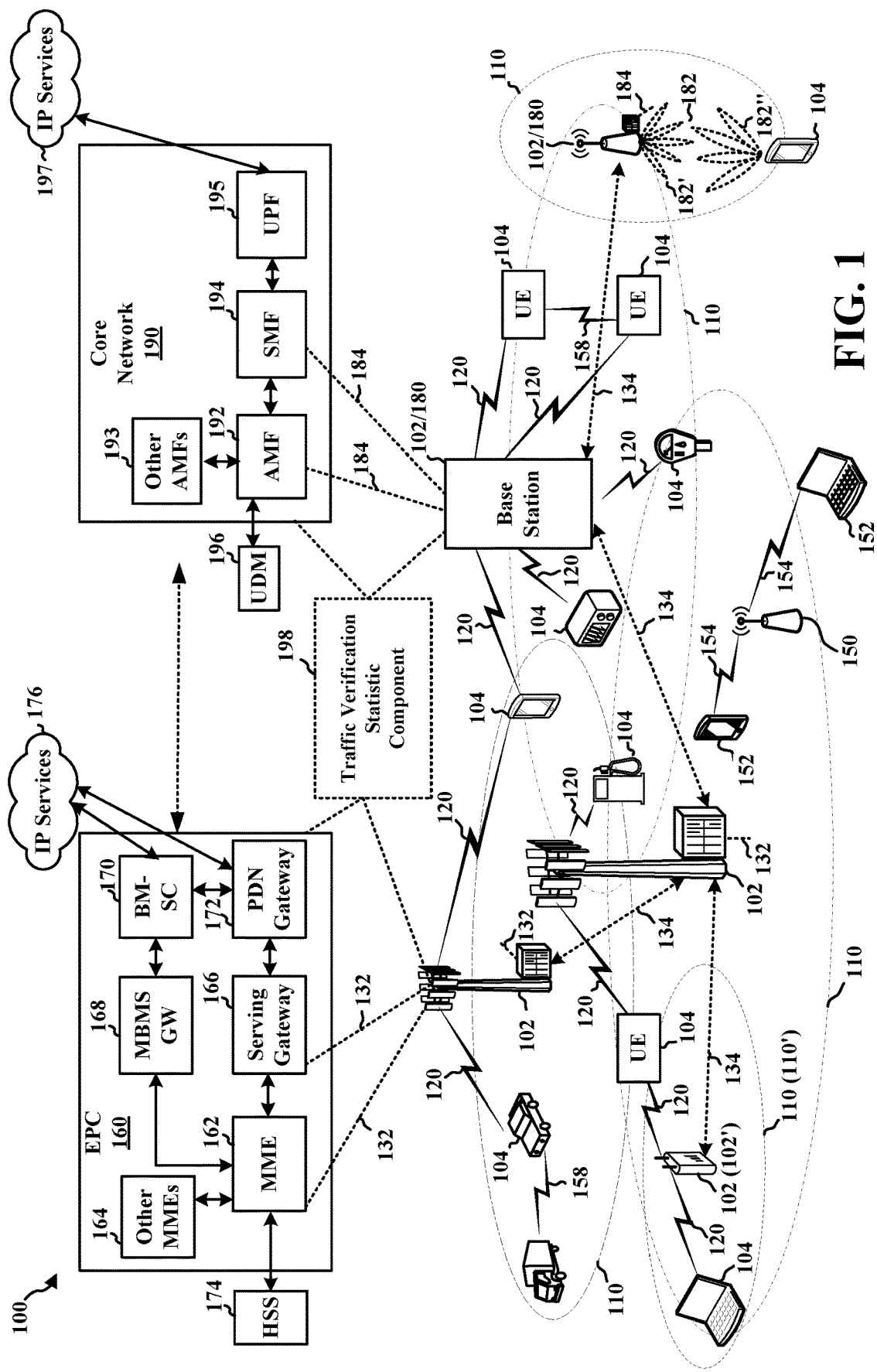
FIG. 1 is a diagram illustrating an example of a wireless communications system and an access network.

In split bearer configurations with a primary node and a secondary node having different RATs or the same RAT but splitting a bearer, it may be challenging to determine traffic verification measurements, such as downlink throughput, uplink throughput, packet/traffic drop rate, and/or a packet loss rate. Aspects presented herein provide for a traffic verification statistics to be determined for data bursts transmitted or received by the MN and the SN for the UE in the split bearer configuration. The MN and/or the SN may provide the core network with data burst statistic information based on at least one of a burst level throughput or a packet loss measurement for a data burst between the UE and the MN based on a first bearer in the split bearer configuration or between the UE and the SN based on a second bearer in the split bearer configuration. In some aspects, the MN and the SN may individual report the data burst statistic for their respective bearer. In some aspects, the SN may provide the data burst statistic for a bearer of the SN to the MN, and the MN may provide a combined report to the core network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In some aspects, one or more of base station 102, 180, or a core network component of EPC 160 or core network 190 may include a traffic verification statistic component 198 that is configured to measure, at an MN or an SN, a data burst statistic for the network node, the data burst statistic being based on at least one of a burst level throughput or a packet loss measurement for a data burst between the UE and the MN based on a first bearer in the split bearer configuration or between the UE and the SN based on a second bearer in the split bearer configuration. The traffic verification statistic component 198 may be configured to provide the data burst statistic from the network node to at least one of the MN or a core network. In some aspects, the traffic verification statistic component 198 at an MN may be configured to receive a data burst statistic from the SN and to determine a combined traffic verification statistic for the MN based on a first bearer and the SN based on a second bearer using the data burst statistic from the SN. At an MN, the traffic verification statistic component may provide the combined traffic verification statistic to a core network component of the EPC 160 or the core network 190, such as a trace collection entity (TCE). Although the following description may be focused on 5G NR and LTE, the concepts described herein may be applicable to other similar areas, such as LTE, LTE-A, CDMA, GSM, and other wireless technologies.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110.

There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to YMHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
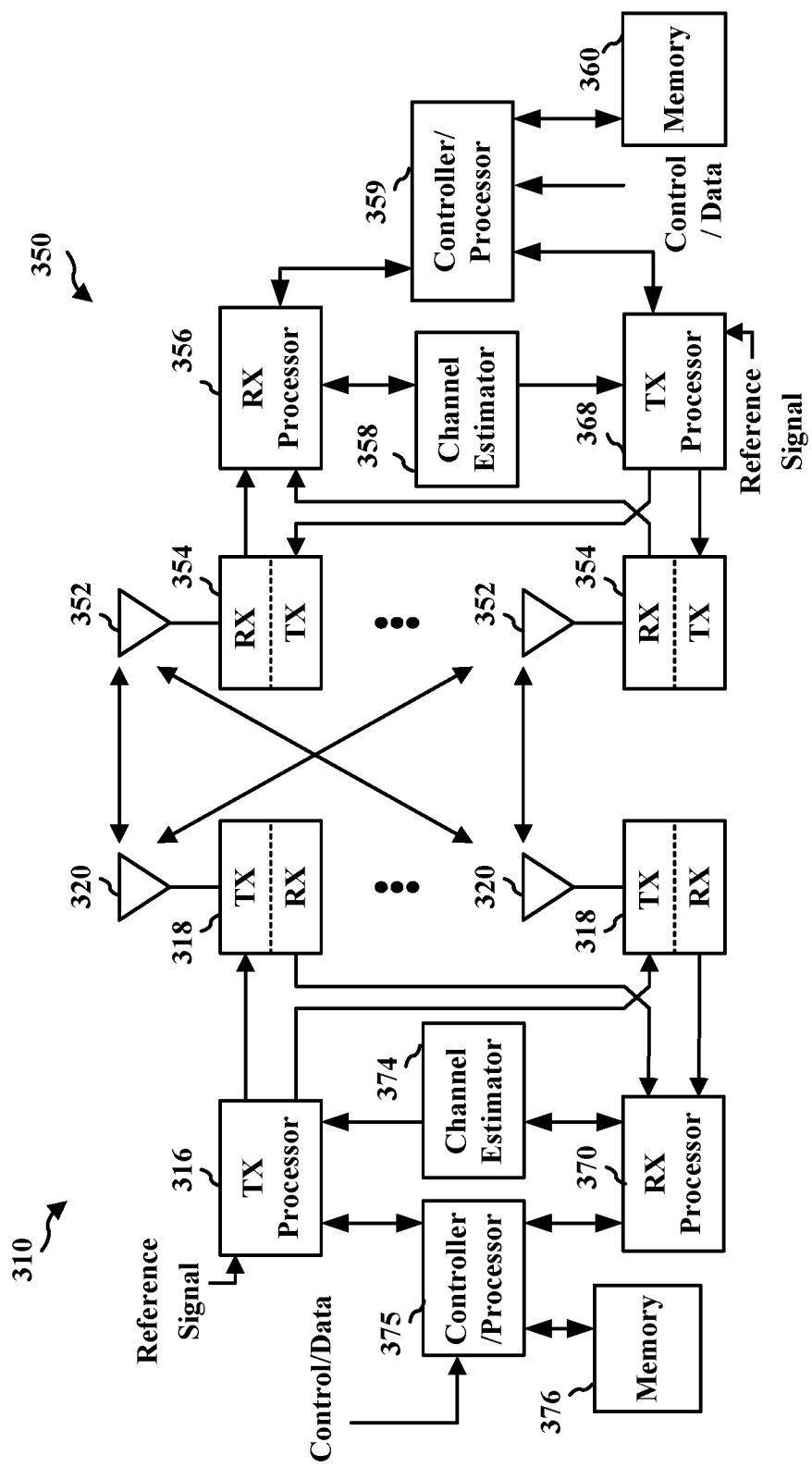
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Although a single base station is illustrated, the UE 350 may be in communication with a first node and a second node. At least one of the TX processor 316, the RX processor 370, and the controller/processor 375 may be configured to perform aspects in connection with the traffic verification statistic component 198 of FIG. 1.

Figure 4A:
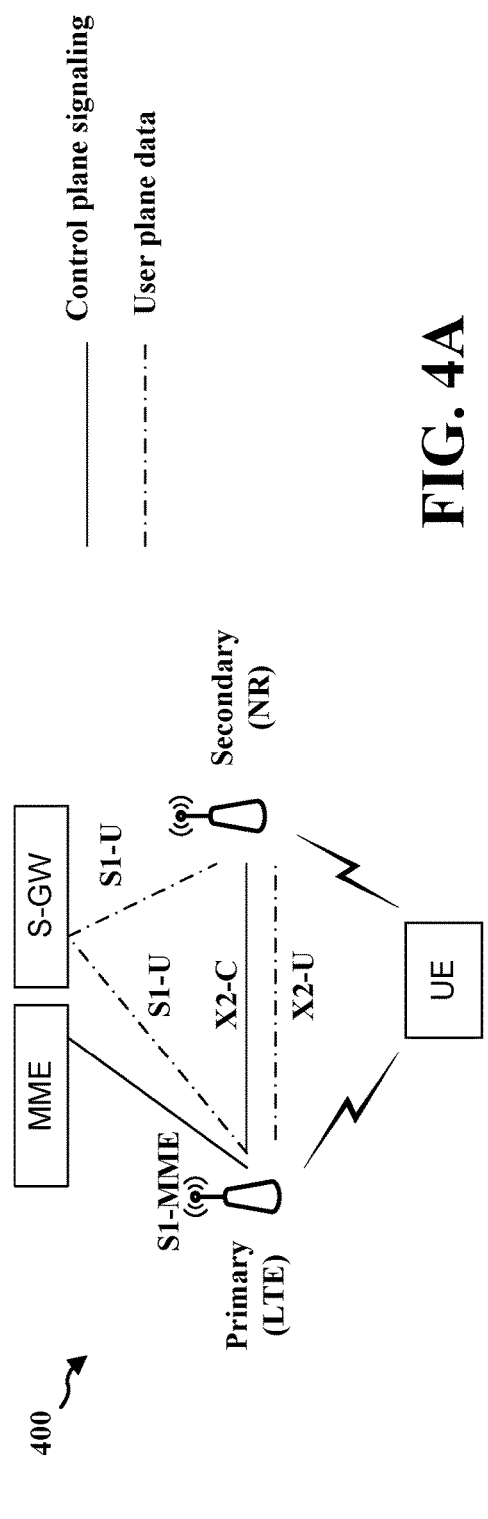
FIG. 4A illustrates an example of dual connectivity with a primary node and a secondary node.

In some aspects, a first RAT may operate as a primary node (MN) (which may be referred to as a master node in some examples) and a second RAT may operate as a secondary node (SN) for wireless communication with one or more UEs. One example of this multiple RAT communication is Evolved Universal Mobile Telecommunications System (UMTS) Terrestrial Radio Access (E-UTRA) New Radio—Dual Connectivity (EN-DC). Although examples are provided for EN-DC with LTE and NR to illustrate the concepts, the concepts are applicable to other RATs and other dual connectivity scenarios, as well. Another split bearer example is multi-RAT dual connectivity (MR-DC). In an EN-DC configuration, the UE may be connected to an LTE network and then may connect to an NR network via an RRC connection reconfiguration process. The UE communicates with both an LTE node and an NR node, e.g., as illustrated in the EN-DC example 400 in FIG. 4A. As illustrated in FIG. 4A, the LTE node may have a control plane connection with the LTE core network and may have a control plane connection, e.g., an X2 connection, with the NR node. For the user plane, or the data plane, the LTE node may have a user plane connection with the LTE network and the NR network, and the NR node may have a user plane connection with the NR network.

Figure 4B:
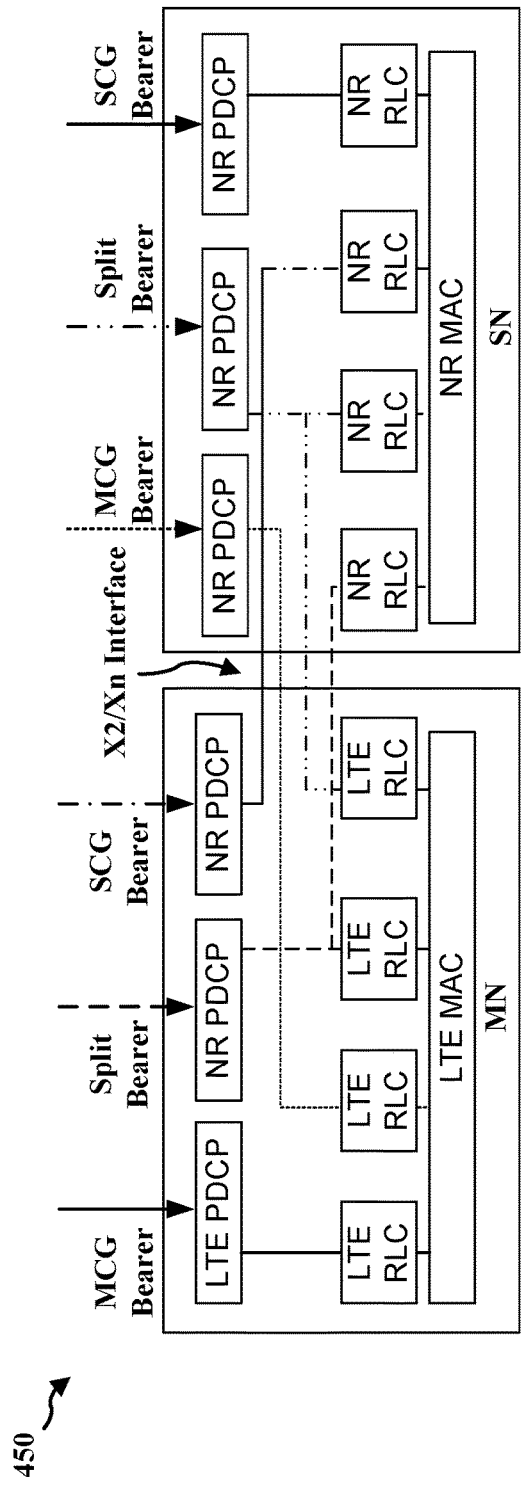
FIG. 4B illustrates a layer 2 architecture for the dual connectivity configuration illustrated in FIG. 4A.

FIG. 4B illustrates an example layer 2 architecture 450 for EN-DC showing LTE as the MN and NR as the SN. In other options, NR may be the MN and LTE may be the SN. FIG. 4B illustrates the MN having a master cell group (MCG) bearer having a packet data convergence protocol (PDCP) and radio link control at the MN and a secondary cell group (SCG) having a PDCP and RLC at the SN. FIG. 4B also illustrates a split bearer at each of the MN and the SN and providing traffic to each of the MN and the SN via an X2/Xn interface between the MN and the SN.

Although the examples in FIGS. 4A and 4B are illustrated for EN-DC with LTE and NR, the concepts may be applied to other combinations of RATs, e.g., for MR-DC.

A network may perform measurements regarding traffic, which may be referred to herein as traffic verification statistics or quality of service (QoS) statistics. Traffic verification statistics may include any of UE throughput, a packet loss rate, a packet discard rate, a Uu loss rate, a packet drop rate, or a PDCP service data unit (SDU) drop rate, among other examples. The UE throughput may include a downlink throughput and/or an uplink throughput. The traffic verification statistics may be based on traffic aggregation or traffic duplication, for example.

The UE throughput measurements may be referred to as M5 measurements, in some examples. M5 measurements may be obtained for both downlink and uplink scheduled UE Internet Protocol (IP) throughput. The UE throughput within a measurement period is determined as a total downlink data burst transmitted within a measurement period divided by the time used for the transmission of the data burst within a measurement period. For example, the UE throughput within a measurement period may be determined as:

$$\text{If } \sum ThpTimeDl > 0, \frac{\sum ThpVolDl}{\sum ThpTimeDl} \times 1000 \text{ [kbits/s]}$$

$$\text{If } \sum ThpTimeDl = 0, 0 \text{ [kbits/s]}$$

In this example, ThpTimeDl corresponds to the measurement time (e.g., the time to transmit the downlink data burst) and ThpVolDl corresponds to total downlink data burst, e.g., the amount of data transmitted in the data burst. For one RAT, such as LTE, the UE throughput may be determined per data radio bearer (DRB), per UE, and per UE for downlink and for uplink. The reference point may be a medium access control (MAC) upper service access point (SAP). The throughput may be determined of PDCP SDUs that are transmitted in multiple transmission time intervals (TTIs). In another RAT, such as NR, the throughput may be determined per DRB, per UE, and per UE for downlink and uplink. The reference point may be an upper MAC SAP. For NR, an average downlink/uplink UE throughout at a base station may be determined for throughput of data bursts taking multiple slots for transmission with the data burst being measured in terms of RLC SDUs. A distribution of downlink/uplink UE throughout for the base station may be determined, e.g., for NR. The throughput distribution may be determined for the data burst that is transmitted over multiple slots with the data burst being measured in terms of RLC SDUs.

As another example of a traffic verification statistic, the network may determine a packet loss rate measurement. The packet loss rate may be referred to as an M7 measurement in some examples. A packet loss measurement may be determined per a measurement period for LTE or for NR.

For example, in LTE, a packet loss rate may be determined per QoS class identifier (QCI) or bearer (e.g., downlink or uplink). The reference point may be a PDCP upper SAP. The packet discard rate may be determined in the downlink as $10^6 \times$ a fraction of packets (PDCP SDU) dropped at the PDCP, RLC, or MAC due to a configuration, traffic measurement, etc., other than a handover. The measurement may capture the statistics for the packets for which no part has been transmitted over the air. A packet Uu loss rate may be determined for downlink traffic based on as $10^6 \times$ a fraction of packets (PDCP SDU) not received by a base station PDCP upper layer.

For example, in NR, the packet loss rate may be determined per DRB. A downlink PDCP SDU drop rate at a base station centralized unit (CU) user plane (UP) (e.g., in a gNB-CU-UP) as $10^6 \times$ a fraction of packets (PDCP SDU) dropped due to a configuration, traffic measurement in the base station-CU-UP (e.g., a gNB-CU-UP). A base station-CU may include RRC, SDAP, and PDCP. A base station-DU may include RLC, MAC, and PHY layers. A dropped packet may be a packet whose context is removed from the base station-CU-UP without any part of the packet having been transmitted on the F1-U, Xn-U, or X2-U interface. A downlink packet drop rate may be determined, e.g., at a base station-distributed unit (DU) (e.g., gNB-DU), as $10^6\times$ a fraction of packets (RLC SDU) dropped at the downlink (e.g., RLC or MAC) due to a configuration, traffic measurement, etc. in the base station-DU. A dropped packet may be a packet whose context is removed from the base station-DU without any part of the packet having been transmitted on the air interface. A packet Uu loss rate in the downlink may be determined per DRB per UE, e.g., as $10^6\times$Uu packet (e.g., RLC SDU) loss rate in the downlink per DRB per UE. An uplink PDCP SDU loss rate may be determined as $10^6\times$ a fraction of packets (PDCP SDU) not received by the base station PDCP upper layer.

Aspects presented herein enable traffic verification measurements, such as M5, throughput measurements or M7, traffic loss measurements for split bearer situations that include a master node using a first RAT and a second node using a second RAT, such as the examples described in connection with FIGS. 4A and 4B. Aspects provide for traffic/packet aggregation with M5 and/or M7 measurements in the split bearer scenario. Aspects may be applied for EN-DC, MR-DC, etc. Aspects provide for traffic/packet duplication with M5 and/or M7 measurements in split bearer scenarios. Aspects may be applied for EN-DC, MR-DC, etc.

Figure 5:
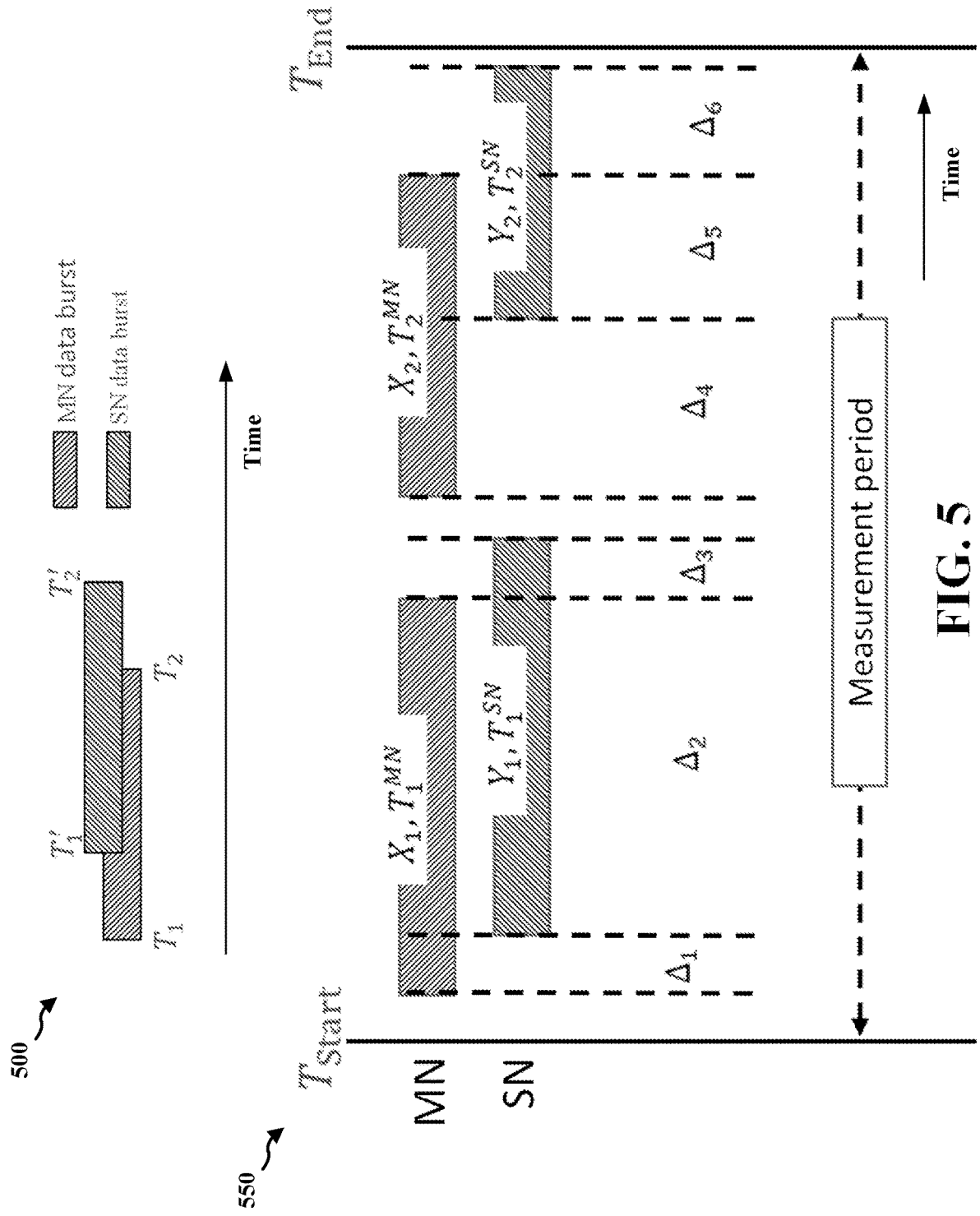
FIG. 5 illustrates example data bursts transmitted with traffic/packet aggregation by an MN and an SN during a measurement period.

FIG. 5 illustrates an example 500 of a data burst from MN beginning at time T1 and ending at time T2 and a data burst from the SN beginning at time T1' and ending at time T2'. T1 may correspond to the point in time when the transmission is started for the first data burst at the MN, and T2 may correspond to the point in time when the data, until the second to last piece of the data burst transmission over the MN, has been successfully received at the UE. T1' may correspond to the point in time when the transmission is started for the first data in the data burst at the SN, and T2' may correspond to the point in time when the data, until the second to last piece of data burst transmission over the SN, has been successfully received at the UE. An M5, throughput measurement in a split bearer scenario with packet/traffic aggregation may include a measurement of the UE throughput based on:

$$\frac{A*(T_2 - T_1) + B*(T_2' - T_1')}{T_2' - T_1}$$

where A is the throughput of a data burst at the MN (e.g., between T1 and T2) and B is a throughput of a data burst at an SN (e.g., between T1' and T2'), which is measured over a measurement period that extends from T1 to T2', e.g., from the beginning of the two data bursts to the end of the two data bursts. In order to obtain an accurate computation of the UE throughput for the split bearer, the SN may provide throughput values, e.g., including time T1' and time T2' to the MN, e.g., over the X2/Xn interface.

FIG. 5 illustrates an example 550 showing multiple transmissions from the MN and the SN during a measurement period. The UE throughput measurement in a measurement period the MN and SN can be computed as:

$$Th_{MN} = \frac{X_1 + X_2}{T_1^{MN} + T_2^{MN}} \text{ and } Th_{SN} = \frac{Y_1 + Y_2}{T_1^{SN} + T_2^{SN}}$$

Following the definition of UE throughput during this measurement period, the UE throughput during this measurement period may be determined as the total data burst over the time to transmit the data bursts, e.g.:

$$\frac{\text{Total data burst}}{\text{Time to transmit}} = \frac{X_1 + X_2 + Y_1 + Y_2}{\Delta_1 + \Delta_2 + \Delta_3 + \Delta_4 + \Delta_5 + \Delta_6}$$

For traffic/packet aggregation, the MN and the SN may be synchronized, e.g., highly synchronized on at least a millisecond level. The SN may provide the MN with statistics about the data burst from the SN. The SN may provide the data burst statistic to the MN in an X2 message. The SN may provide the data burst statistic to the MN in an Xn message. The SN may provide the data burst statistic to the MN in a user plane message. The SN may provide the data burst statistic to the MN in a control plane message. The SN may provide the data burst statistic to the MN after a measurement period. The SN may provide the data burst statistic for each data burst individually or may report statistics for a group of data bursts. The data burst statistic(s) that the SN provides to the MN may include one or more of a downlink burst size (e.g., in Kbits), a downlink burst throughput measured at the SN (e.g., in Kbits/s), a start time of the downlink burst transmission (e.g., T1 or T1'), an end time associated with the downlink data burst transmission (e.g., T2, which may be an end time or a time when the second to last piece of the downlink data burst is successfully received), or a flag to indicate whether the measurements are obtained in a traffic aggregation scenario or a traffic duplication scenario. For a split bearer, the bearer is a single bearer, but a single data radio bearer (DRB) is split over two different RLC legs. For downlink communication, traffic aggregation includes splitting the traffic over the MN and the SN over the single bearer and two different RLC legs, and the UE aggregates the received downlink packets. For uplink communication, the UE splits the traffic and sends the traffic to the MN and the SN, and the base station aggregate the traffic. In traffic duplication the same traffic/packets/data bursts are sent over both the MN and the SN RLC legs over a single DRB.

FIG. 6A illustrates an example communication flow 600 showing a MN 604 and a SN 602 using a split bearer operation to exchange data bursts 608 and 610 with a UE 603. Although a single UE is shown to illustrate the concept, the aspects may be applied for communication with multiple UEs. FIG. 6A illustrates an example in which the SN 602 provides statistic information to the MN 604, and the MN provides combined statistic information to the TCE 606. FIG. 6B illustrates an example in which the SN 602 and the MN 604 provide their individual statistics 622 and 624 to the TCE 606.

As illustrated in FIG. 6A, the SN may provide the data burst statistics 614 for the data burst 610 to the MN. FIG. 6B illustrates an example in which the SN may provide the data burst statistics 624 to the TCE 606 rather than to the MN 604.

At 616, the MN may use the data burst statistics 614 along with data burst statistics for the data burst 608 from the MN 604 to determine a combined traffic verification statistic. For example, the MN may determine the correct UE throughput in the measurement period, e.g., the correct downlink UE throughput in a measurement period may be obtained using the downlink data bursts statistics from the MN and the SN over a split bearer, at 616. After determining the combined traffic verification statistic, the MN may provide the traffic verification statistic to a core network component, such as a trace collection entity 606.

In some examples, the MN may provide a request 612 to the SN to provide the data burst statistics 614. The request 612 may be referred to as a QoS monitoring request, e.g., an M5 QoS monitoring request. The request 612 may indicate to the SN that the MN expects the SN to report data burst size, a throughput, a start time (e.g., T1), an end time (e.g., T2), etc. The SN may send the data burst statistics 614 in response to receiving the request 612. The MN may provide an acknowledgment to the SN in response to receiving the data burst statistics. For example, the MN may provide the determined combined statistic 620 to the SN (e.g., a combined UE throughput). Additionally, or alternatively, the parameters can be padded to a downlink data delivery message.

In some examples, the MN and the SN may prepare and send M5 measurements reports with additional information, such as the data burst size, start time, end time, etc. The MN and the SN may provide the M5 measurements with the additional information directly to the TCE. FIG. 6B illustrates an example 650 in which the MN 604 provides data burst statistics 622 with the additional data burst size, start time, and/or end time to the TCE 606. Similarly, the SN provides the data burst statistics 624 with the additional data burst size, start time, and/or end time to the TCE 606. Then, at 626, the TCE determines the combined traffic verification statistic for the MN and the SN as split bearers.

The TCE 606 may use the combined traffic verification statistic, whether received from the MN, at 618, or determined, at 626, to measure whether fairness has been achieved in throughput to various UEs.

In some examples, a PDCP throughput may be determined per DRB per each RLC leg and per UE using the data burst statistics for the SN and the MN (e.g., at 616 or 626). In order to determine a measurement of fairness, the MN or the TCE may determine whether, or how much, PDCP layer transmission opportunity is evenly provided to each UE over a DRB during the measurement period (e.g., per measurement period). The PDCP entity may count the traffic (x) per UE per DRB and may send the counted traffic (x) down to the RLC entity in the measurement period (T). The RLC may report the unsent traffic (δx) per UE per DRB to the PDCP entity. The PDCP throughout may be determined as (x−δx)/T.

Figure 7:
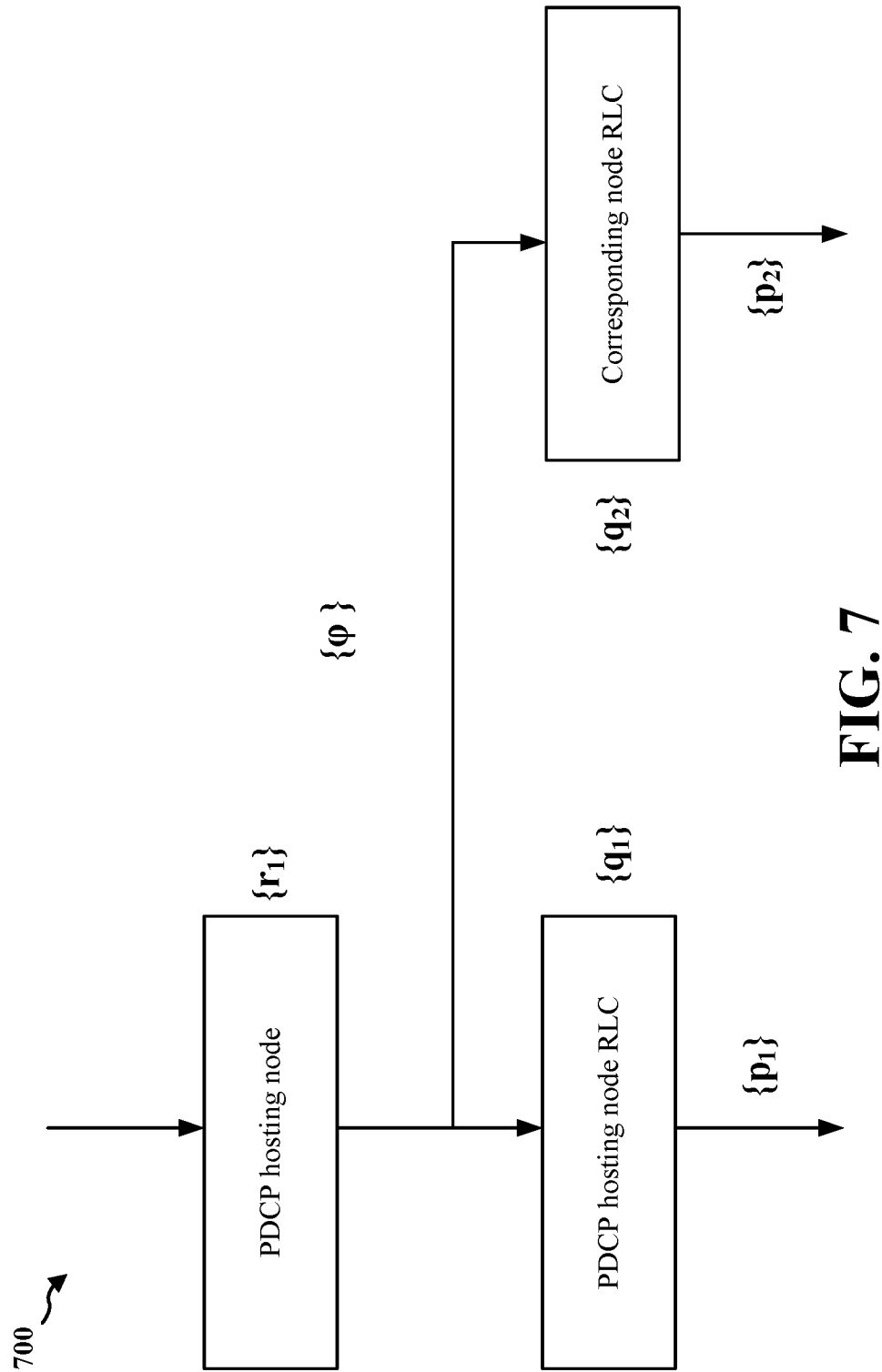
FIG. 7 illustrates example packet discard/packet loss for a split bearer configuration.

In addition to M5 throughput measurements, the network may determine traffic/packet aggregation measurements for packet loss or drop rates, which may be referred to as M7 measurements. There may be challenges in determining the dropped packets for EN-DC. The Uu packet drop rate may be determined in the PDCP SDU in LTE, for example, while the Uu packet drop rate for NR may be determined in the RLC SDU. The Uu packet drop rate may be determined per DRB in LTE while the Uu packet drop rate for NR may be determined per DRB per UE. In EN-DC both NR and LTE may have asymmetric traffic increasing the difficulty in determining a combined Uu packet drop rate. As presented herein, the SN may provide information about the total number of RLC SDU at the SN during the measurement period, at 614 or 624. Similarly, the data burst statistics 622 may include corresponding information for the MN 604. For example, if p1 is the Uu packet drop rate at the MN and p2 is the Uu packet drop rate at the SN, the Uu packet drop rate may be determined as:

$$\frac{N_1 p_1 + N_2 p_2}{N_1 + N_2},$$

where N1 is the number of RLC SDUs of which some part is transmitted at the MN over the air interface and N2 is the number of RLC SDUs of which some part is transmitted at the SN over air interface. In order to compute the packet discard/drop rate accurately in the split bearer scenario, similar numbers may be needed. FIG. 7 illustrates an example of a split bearer diagram 700 showing a PDCP hosting node with packet rate r1 that is split among PDCP hosting node RLC for the MN and a corresponding node RLC for the SN. In FIG. 7, q1 corresponds to the packet drop/discard rate at the RLC and MAC of the MN, and q2 corresponds to the packet drop/discard rate at the RLC and MAC of the SN. FIG. 7 illustrates the Uu packet drop rate at the MN and the SN.

The SN may provide the N2 value to the MN in order for the MN to compute the Uu packet loss rate. For example, in FIG. 6A, the SN 602 may provide the N2 value to the MN 604 in the data burst statistics 614 or to the TCE 606 in the data burst statistics 624. Then, at 616, the MN may determine the combined Uu packet loss rate based on the MN packet loss information and the N2 value from the SN. Similarly, the data burst statistics 622 may include corresponding information for the MN 604.

In order to align the definition or unit of packets, the SN may optionally send the sequence number of the lost RLC SDUs to the MN, e.g., similar to a transmission control protocol (TCP) selective acknowledgment (SACK). For a packet drop rate/discard rate, the SN may send the sequence number of the lost RLC SDUs to the MN and may include the number of dropped RLC SDUs at the base station-DU in the measurement period. Similarly, the data burst statistics 622 may include corresponding information for the MN 604.

The data burst statistics 614 or 624, may include any of a number of RLC SDU for which some part is transmitted over the air at the SN, the sequence number of RLC SDU for which some part is transmitted over the air at the SN in the TCP SACK format, the number of dropped RLC SDUs at the base station-DU in the measurement period, or the sequence number of the RLC SDU dropped at the base station-DU in the TCP SACK format. Similarly, the data burst statistics 622 may include corresponding information for the MN 604. As illustrated in FIG. 6A, the MN may send a request, e.g., an M7 QoS monitoring request or other request, to the SN 602 to indicate for the SN that the MN expects to receive such parameters. The SN 602 may send the data burst statistics 614 in response to receiving the request 612.

Although described for an EN-DC example, the concept may also be applied for MR-DC.

In some examples, the SN may provide the N2 value to the TCE rather than to the MN, such as shown in FIG. 6B.

In addition to application for measurements in connection with traffic/packet aggregation, the aspects may be applied for traffic duplication using split bearers at an MN and an SN.

Figure 8:
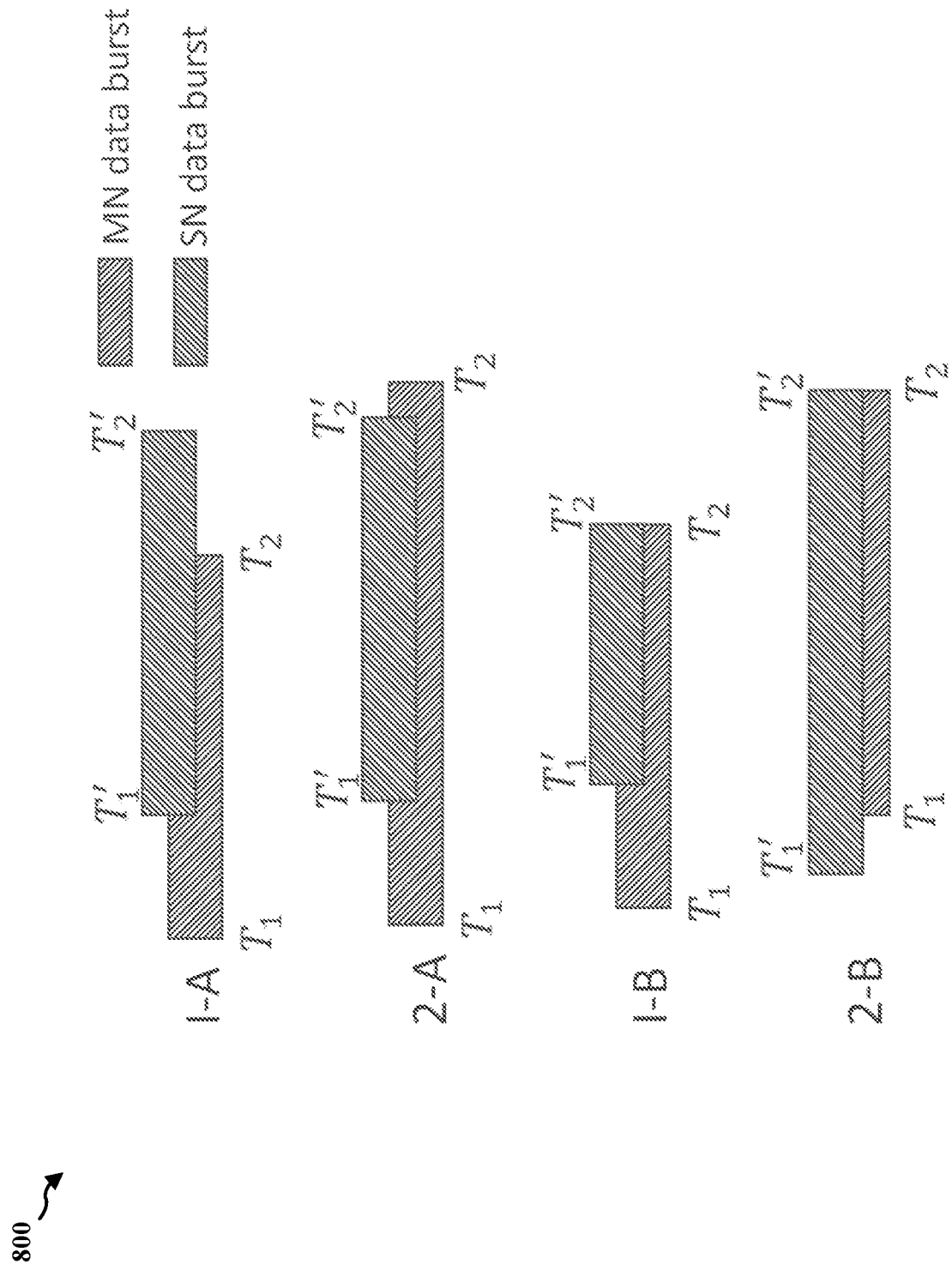
FIG. 8 illustrates traffic/packet duplication for a split bearer configuration.

FIG. 8 illustrates an example of traffic/packet duplication 800 over an MN and an SN. For a data burst of size B, the example 1-A and 2-A include synchronization on the data burst level. If all of the parts of the data burst are successfully acknowledged at either the MN or the SN, then the data burst will not be transmitted over the other of the MN or the SN. Otherwise, the entire data burst is transmitted over both the MN and the SN. The transmission over the MN and the SN may end at different times. Both the MN and the SN transmit the complete data burst. The Examples 1-B and 2-B include synchronization that can be achieved on a finer granularity. If some part of the data burst is successfully received and acknowledged at either the MN or the SN, then that part of the data burst is not transmitted over the other of the MN or the SN. The transmission over the MN and the SN for 1-B and 2-B end at the same time, and the MN and SN both transmit part of the complete data burst.

M5 throughput measurements may be determined for split bearer scenarios with packet/traffic duplication, such as described in connection with FIG. 8.

For 1-A and 2-A, the MN throughput, the SN throughput, and the actual throughput may be determined based on:

At MN: B/(T2−T1); At SN: B/(T2'−T1');
Actual (1-A): B/(T2−T1); Actual (2-A): B/(T2'−T1)

For 1-B and 1-B, the MN throughput, the SN throughput, and the actual throughput may be determined based on:

At MN: B'/(T2−T1); At SN: B"/(T2'−T1');
Actual (1-B): B/(T2−T1); Actual (2-B): B/(T2'−T1')

where B' is the part of the data burst transmitted over the MN and B" is the part of the data burst transmitted over the SN.

Figure 9A:
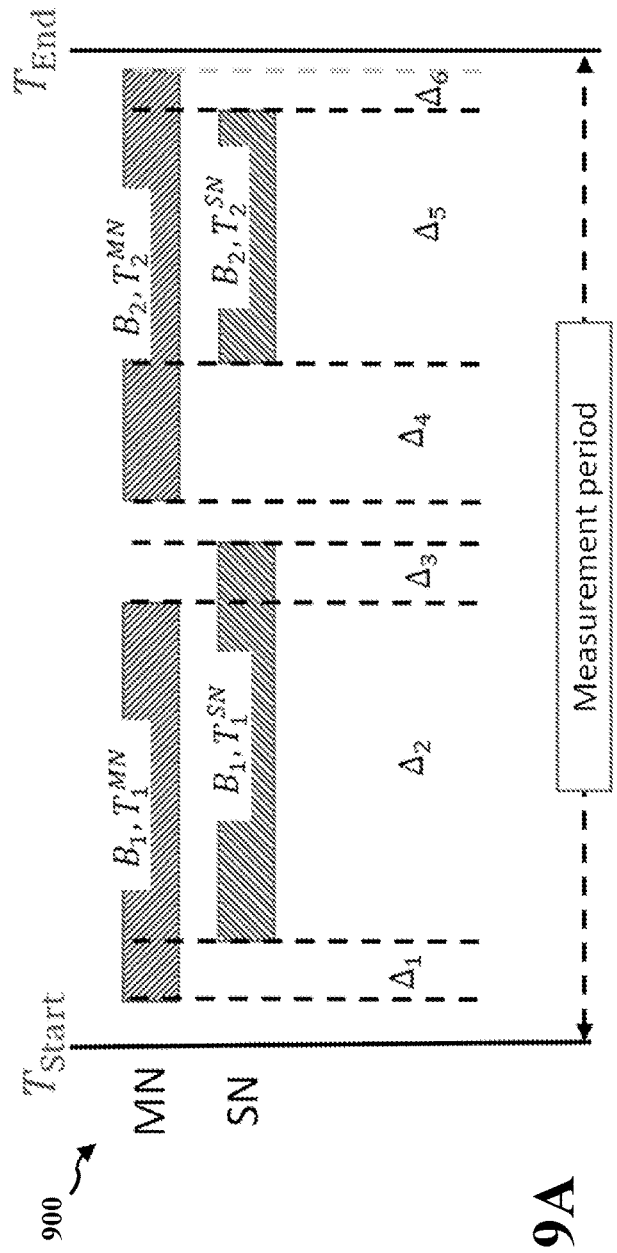
FIG. 9A and FIG. 9B illustrate examples of traffic/packet duplication using a split bearer.

FIG. 9A illustrates an example time diagram 900 showing a split bearer scenario with packet/traffic duplication similar to the example for 1-A and 2-A in FIG. 8. In FIG. 9A, the UE throughput may be determined based on:

$$\frac{B_1 + B_2}{\Delta_1 + \Delta_2 + \Delta_4 + \Delta_5}$$

The example in FIG. 9A illustrates that the individual throughput at the MN and the SN may be different from the actual UE throughput.

Figure 9B:
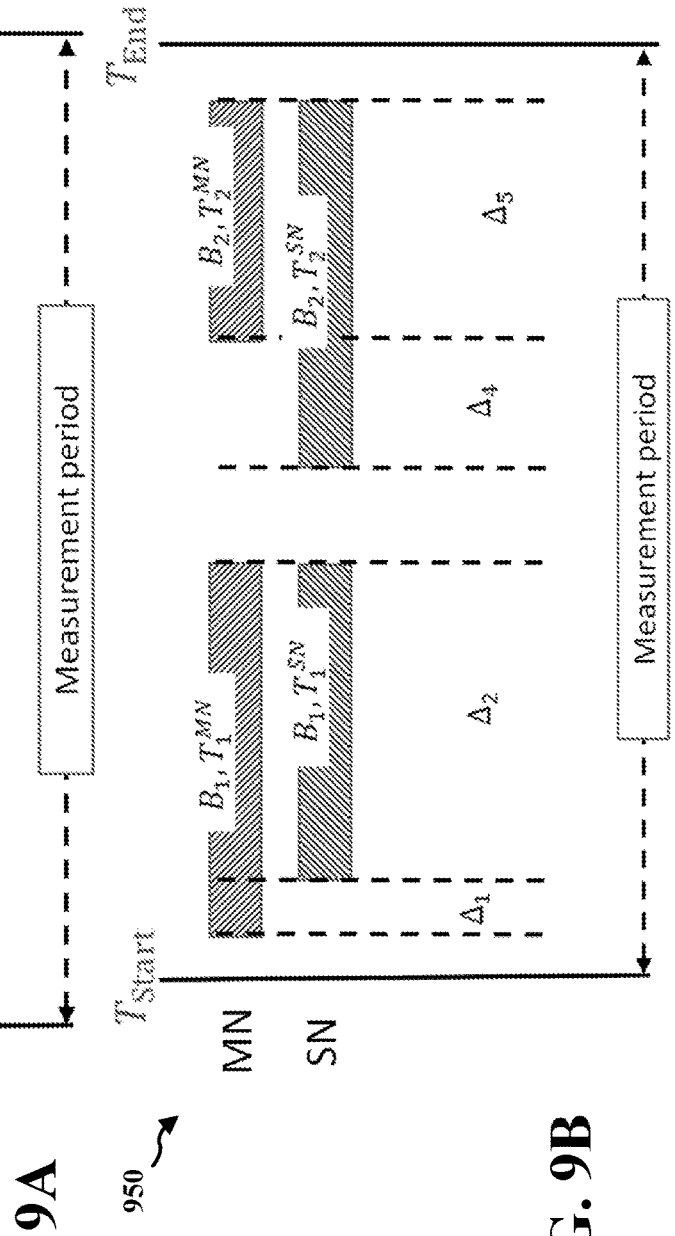

FIG. 9B illustrates an example time diagram 950 showing a split bearer scenario with packet/traffic duplication similar to the example for 1-B and 2-B in FIG. 8. In FIG. 9B, the UE throughput may be determined based on:

$$\frac{B_1 + B_2}{\Delta_1 + \Delta_2 + \Delta_4 + \Delta_5}$$

As with FIG. 9A, the individual throughput at the MN and the SN may be different than the actual UE throughput.

The starting time and the ending time of the transmission may be used to obtain the correct UE throughput. As described in connection with FIG. 6A and FIG. 6B, the SN may provide the data burst statistics, e.g., including the starting time and ending time, to the MN in order to assist in a determination of the actual UE throughput, at 616, e.g., for a split bearer with traffic/packet duplication. In some examples, as described in connection with FIG. 6B, the SN and the MN may provide the data burst statistics including start time and end time to the TCE 606 for the determination of the actual UE throughput, at 626.

In the example for 1-A and 2-A in FIG. 8 or for FIG. 9A, where the entire data burst is transmitted over the MN and the SN, as the data is transmitted, the packet drop/discard rate and/or the loss rate may be calculated. For example, calculation may be based on determining the RLC SDUs/PDCP PDUs that are dropped at the RLC and the MAC at the MN, determining the RLC SDUs/PDCP PDUs that are dropped at the RLC and the MAC at the SN, determining the RLC SDUs/PDCP PDUs that are lost as the Uu interface at the MN, and/or determining the RLC SDUs/PDCP PDUs that are lost as the Uu interface at the SN. The packet drop rate may be determined by determining the missing RLC SDU/PDCP PDU sequence number common to both the MN and the SN.

For example, in the example for 1-B and 2-B in FIG. 8 or FIG. 9B, where a part of the data burst is transmitted over the MN and the SN, as the data is transmitted, the packet drop/discard rate and the loss rate may be determined similar to the example for 1-A and 2-A, where the PDCP PDU/RLC SDU sequence number can be used to determine the packet loss/discard rate. As described in connection with FIG. 6A, the SN may provide the data burst statistics 614 to the MN 604 including any of a number of RLC SDU for which some part is transmitted over the air at the SN, the sequence number of RLC SDU for which some part is transmitted over the air at the SN in the TCP SACK format, the number of dropped RLC SDUs at the base station-DU in the measurement period, or the sequence number of the RLC SDU dropped at the base station-DU in the TCP SACK format. The MN 604 may use the data burst statistics 614 to determine a combined packet drop/discard rate or a combined Uu loss rate for traffic/packet duplication using a split bearer. Additionally, or alternatively, the SN and the MN may provide the statistics to the TCE 606, which may determine the combined packet drop/discard rate or a combined Uu loss rate for traffic/packet duplication using a split bearer.

In addition to application for the determination of a combined downlink throughput, the aspects described in the present application may be applied to determine an uplink throughput for a split bearer. The MN and the SN may receive uplink packets simultaneously, or overlapping in time. As illustrated in FIG. 6A and FIG. 6B, the data bursts 608 and 610 may be uplink data burst from the UE 603 to the MN 604 and the SN 602. As illustrated in FIG. 6A, the SN 602 may provide the data burst statistics 614 about the uplink data burst to the MN, and the MN may determine a combined uplink throughput. Similarly, the MN and the SN may provide the uplink data burst statistics to the TCE, which may determine the combined uplink throughput. The data burst statistics 614, 622, and/or 624 may include an uplink burst size (e.g., in Kbits), and uplink burst throughput (e.g., in Kbits/s), a start time of the uplink data burst (e.g., T1), and/or an end time associated with the uplink data burst (e.g., T2, which may be the second to last piece of uplink data burst being successfully received).

In order to determine the uplink packet loss rate, the base station may determine a missing PDCP SDU sequence number.

Figure 11:
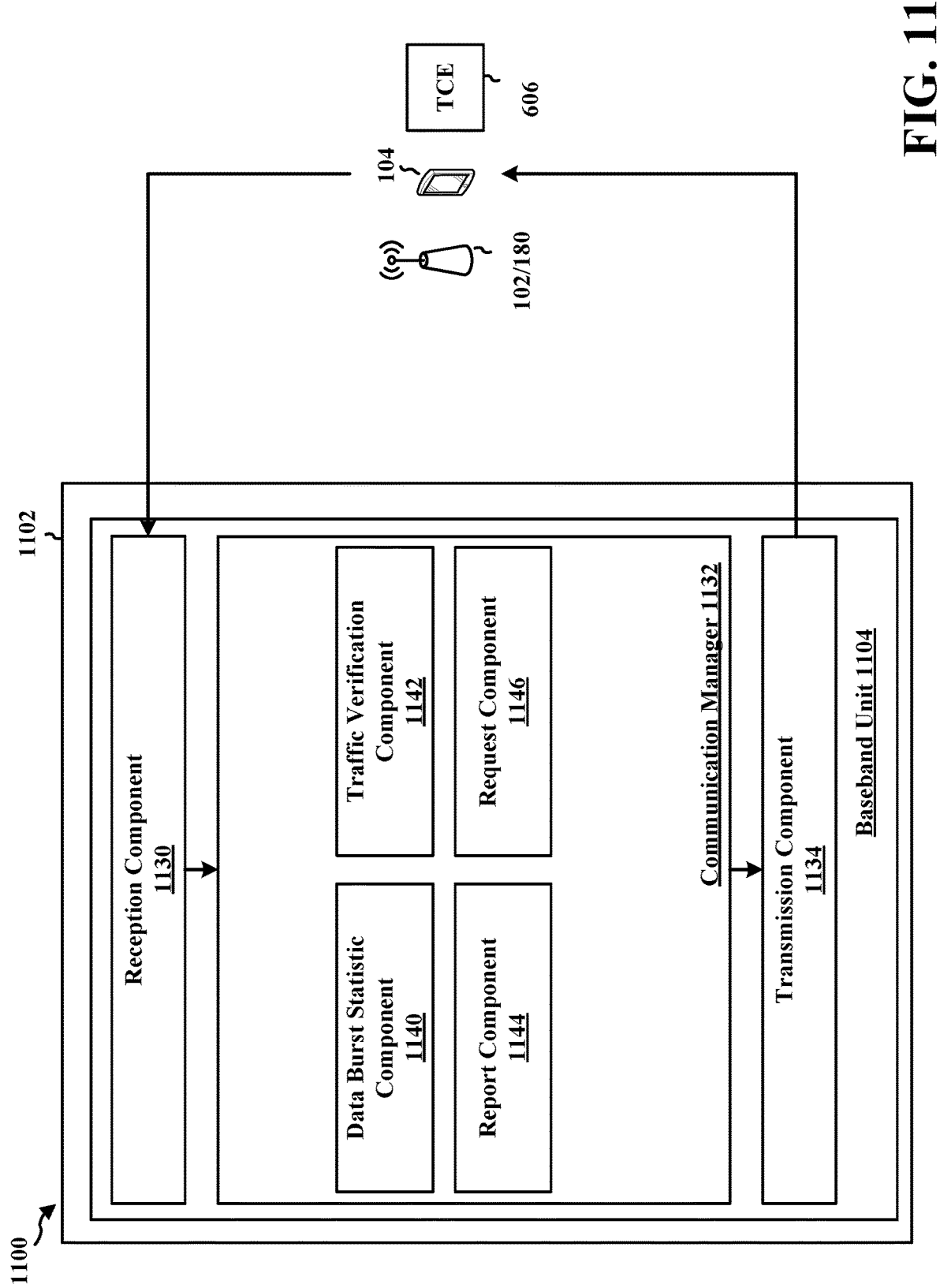
FIG. 11 is a diagram illustrating an example of a hardware implementation for an example apparatus.

FIG. 10A is a flowchart 1000 of a method of wireless communication. FIG. 11 illustrates an example diagram 1100 of a hardware apparatus that may be configured to perform the method of FIG. 10A. The method may be performed by a master node (e.g., MN 604) that transmits data to one or more UEs in association with a secondary node, e.g., using a split bearer, as described in connection with any of FIGS. 4A-10. The method may be performed by a base station or a component of a base station (e.g., the base station 102, 180, 310). The method may enable improved traffic verification statistics for split bearer configuration involving a MN of a first RAT and a SN of a second RAT, for example.

At 1004, the MN receives a data burst statistic from an SN. The data burst statistic may be received from the SN in at least one of: an X2 message, an Xn user plane message, a control plane message, or a downlink data delivery message, e.g. as described in connection with the data burst statistic 614. The reception may be performed, e.g., by the reception component 1130 and/or the data burst statistic component 1140 of the apparatus 1102 in FIG. 11.

At 1008, the MN may provide, to a core network component, a combined traffic verification statistic for the MN based on a first bearer and the SN based on a second bearer using the data burst statistic from the SN, e.g., as described in connection with 618 in FIG. 6A. The MN may provide the combined traffic verification statistic to the core network, e.g., by the transmission component 1134 and/or the report component 1144. The combined traffic verification statistic may include a combined downlink throughput for the MN based on the first bearer and the SN based on the second bearer. The data burst statistic, received at 1004 and used to determine the combined throughput, may include one or more of: a data burst size, a start time of a data burst, a time associated with an end of the data burst, an aggregation indication indicating traffic aggregation, or a duplication indication indicating traffic duplication.

The combined traffic verification statistic may include a combined packet drop rate and Uu loss rate for the MN based on the first bearer and the SN based on the second bearer. The data burst statistic that is received and used to determine the combined packet drop rate/Uu loss rate may include one or more of: a number of dropped RLC SDUs at the SN during a measurement period, or a number of RLC SDUs of which a part is transmitted at the SN during the measurement period. The packet loss and/or the Uu loss rate may be determined by the MN indicates at least one of: a first number of RLC SDUs for which a part is transmitted over the air at the SN, a first sequence number of RLC SDU for which a part is transmitted over the air at the SN in a TCP SACK format, a second number of dropped RLC SDUs at a DU in a measurement period, or a second sequence number of RLC SDU dropped at the DU in the TCP SACK format.

The combined traffic verification statistic may include a combined downlink throughput for traffic duplication based the MN using the first bearer and the SN using the second bearer. The combined traffic verification statistic may include a combined uplink throughput for the MN based on the first bearer and the SN based on the second bearer. The data burst statistic may include one or more of: an uplink data burst size for an uplink data burst, a start time of the uplink data burst, or an end time associated with an end of the uplink data burst.

The MN may receive a QoS monitoring request, and may provide the combined packet loss rate and Uu loss rate to the core network component in response to the QoS monitoring request.

FIG. 10B illustrates a flowchart 1050 of a method of wireless communication. FIG. 11 illustrates an example diagram 1100 of a hardware apparatus that may be configured to perform the method of FIG. 10B. The method may be performed by a master node (e.g., MN 604) that transmits data to one or more UEs in association with a secondary node, e.g., using a split bearer, as described in connection with any of FIGS. 4A-10. The method may be performed by a base station or a component of a base station (e.g., the base station 102, 180, 310). The method may enable improved traffic verification statistics for split bearer configuration involving a MN of a first RAT and a SN of a second RAT, for example.

The method may include receiving a data burst statistic from an SN, at 1004, and providing a combined traffic verification statistic to the core network, at 1008, as described in connection with FIG. 10A.

In some aspects, at 1006, the MN may determine a combined traffic verification statistic. The combined downlink throughput may include a PDCP layer throughput for each radio bearer for individual RLC legs and for each UE. The determination may be performed, e.g., by the traffic verification component 1142 in the apparatus 1102 in FIG. 11, and may include a determination based on any of the aspects presented herein.

In some aspects, the MN may provide an indication to the SN to report data burst statistic, e.g., as information for throughput, packet drop rate, or packet loss rate, at 1002, where the MN receives the data burst statistic, at 1004, based on the indication. For example, the indication may include any of the aspects described in connection with the request 612 in FIG. 6A. The MN may provide the indication to the SN, e.g., by the transmission component 1134 and/or the request component 1146.

Ain some aspects, at 1010, the MN may provide the combined downlink throughput to the SN, e.g., as an acknowledgment of the data burst statistics. The MN may provide the combined traffic verification statistic to the SN, e.g., by the transmission component 1134 and/or the report component 1144.

FIG. 11 is a diagram 1100 illustrating an example of a hardware implementation for an apparatus 1102. The apparatus 1102 is a MN apparatus, and may be a base station, a component of a base station or may implement base station functionality. The apparatus 1102 may include a baseband unit 1104. The baseband unit 1104 may communicate through a cellular RF transceiver with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes a data burst statistic component 1140 that receives a data burst statistic from an SN, e.g., as described in connection with 1004. The communication manager 1132 may further include a traffic verification component 1142 that determines a combined traffic verification statistic using the data burst information from the SN, e.g., as described in connection with 1006. The communication manager 1132 further includes a report component 1144 that provides a combined traffic verification statistic to a core network component, e.g., as described in connection with 1008. The communication manager 1132 further includes a request component 1146 that sends an indication to the SN to request the data burst statistic, e.g., as described in connection with 1002.

The apparatus may include additional components that perform each of the blocks of the algorithm in the flowchart of FIG. 10 and/or the aspects performed by the MN in FIGS. 6A and 6B. As such, each block in the flowchart of FIG. 10 and/or the aspects performed by the MN in FIGS. 6A and 6B. may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband unit 1104, includes means for means for receiving, at a MN, a data burst statistic from a SN and means for providing, to the core network component, a combined traffic verification statistic for the MN based on a first bearer and the SN based on a second bearer using the data burst statistic from the SN. The apparatus 1102 may further include means for determining a combined traffic verification statistic for the MN based on a first bearer and the SN based on a second bearer using the data burst statistic from the SN. The apparatus 1102 may further include means for providing the combined downlink throughput to the SN. The apparatus 1102 may further include means for providing an indication to the SN to report data burst information for throughput, where the MN receives the data burst statistic based on the indication. The apparatus 1102 may further include means for receiving a QoS monitoring request, where the MN provides the combined packet loss rate and Uu loss rate to the core network component in response to the QoS monitoring request. The means may be one or more of the components of the apparatus 1102 configured to perform the functions recited by the means. As described supra, the apparatus 1102 may include the TX Processor 316, the RX Processor 370, and the controller/processor 375. As such, in one configuration, the means may be the TX Processor 316, the RX Processor 370, and the controller/processor 375 configured to perform the functions recited by the means.

FIG. 12A is a flowchart 1200 of a method of wireless communication at a network node having a split bearer configuration for a UE. FIG. 13 illustrates an example diagram 1300 of a hardware apparatus that may be configured to perform the method of FIG. 12A. In some aspects, the method may be performed by a secondary node (e.g., SN 602) that transmits data to one or more UEs in association with a primary node, e.g., using a split bearer, as described in connection with any of FIGS. 4A-9B. In some aspects, the method may be performed by a primary node (e.g., the MN 604) that transmits data to one or more UEs in association with a secondary node using a split bearer, as described in connection with any of FIGS. 4A-9B. The method may be performed by a base station or a component of a base station (e.g., the base station 102, 180, 310). The method may enable improved traffic verification statistics for split bearer configuration involving a MN of a first RAT and a SN of a second RAT, for example.

At 1204, the MN or the SN node measures a data burst statistic for the network node. The data burst statistic is based on, or corresponds to, at least one of a burst level throughput or a packet loss measurement for a data burst between the UE and the MN based on a first bearer in the split bearer configuration or between the UE and the SN based on a second bearer in the split bearer configuration. The determination may be performed, e.g., by the statistic measurement component 1342 of the apparatus 1302, for example.

Then, the network node provides the data burst statistic from the network node to at least one of a MN based on a second bearer or a core network component. In some aspects, the network node may be the SN, and the SN may provide the data burst statistic in at least one of: an X2 message, an Xn user plane message, a control plane message, or a downlink data delivery message.

The data burst statistic may include one or more of: a data burst size, a start time of a data burst, a time associated with an end of the data burst, an aggregation indication indicating traffic aggregation, or a duplication indication indicating traffic duplication. The data burst statistic may be provided, e.g., by the data burst statistic component 1340 of the apparatus 1302, for example. The data burst statistic may include one or more of: a number of dropped RLC SDUs at the MN or the SN during a measurement period, a number of RLC SDUs of which a part is transmitted at the MN or the SN during the measurement period, a first number of RLC SDUs for which a part is transmitted over the air at the MN or the SN, a first sequence number of RLC SDU for which a part is transmitted over the air at the MN or the SN in a TCP SACK format, a second number of dropped RLC SDUs at a distributed unit (DU) in a measurement period, or a second sequence number of RLC SDU dropped at the DU in the TCP SACK format. The data burst statistic may include one or more of: an uplink data burst size of an uplink data burst, a start time of the uplink data burst, or an end time associated with an end of the uplink data burst.

As illustrated at 1208, the network node may provide the data burst statistic to a core network component. In some aspects, the network node may be the MN that measures the data burst statistic for the MN based on the first bearer and provides the data burst statistic, at 1208, from the MN to the core network component. In other aspects, the network node may be the SN that measures the data burst statistic for the SN based on the second bearer and provide the data burst statistic, at 1208, from the SN to the core network component.

As illustrated at 1206, the network node may be the SN, and the SN may provide the data burst statistic to the MN for determination of a combined downlink throughput for the MN based on the first bearer and the SN based on the second bearer. The data burst statistic may be provided, e.g., by the data burst statistic component 1340 of the apparatus 1302, for example.

In some aspects, the SN may provide the data burst statistic to the MN, at 1206 for determination of a combined packet drop rate and Uu loss rate for the MN based on the first bearer and the SN based on the second bearer.

In some aspects, the SN may provide the data burst statistic to the MN, at 1206 for determination of a combined uplink throughput for the MN based on the first bearer and the SN based on the second bearer. The data burst statistic may be provided, e.g., by the data burst statistic component 1340 of the apparatus 1302, for example.

FIG. 12B is a flowchart 1250 of a method of wireless communication at a network node having a split bearer configuration for a UE. FIG. 13 illustrates an example diagram 1300 of a hardware apparatus that may be configured to perform the method of FIG. 12A. The method may be performed by a secondary node (e.g., SN 602) that transmits data to one or more UEs in association with a secondary node, e.g., using a split bearer, as described in connection with any of FIGS. 4A-10. The method may be performed by a base station or a component of a base station (e.g., the base station 102, 180, 310). The method may enable improved traffic verification statistics for split bearer configuration.

The method of FIG. 12B may include the network node measuring the data burst statistic, at 1204, and providing the data burst statistic to an MN or a core network component, at 1206 or 1208, as described in connection with FIG. 12A.

As illustrated at 1202, the network node may further receive an indication from the MN or the core network component to report data burst information for throughput, where the network node provides the data burst statistic based on the indication. As an example, the network node may be an SN that receives the indication from the MN and may response by reporting the data burst statistic, at 1206 to the MN. In some aspect, the SN may receive the indication from the core network, and may provide the data burst statistic to the MN, at 1206, or the core network, at 1208, in response to the indication. In some aspects, the network node may be an MN that receives the indication from the core network and that provides the data burst statistic to the core network, at 1208 in response to the indication. The reception of the indication may be performed, e.g., by the reception component 1330 and/or the request component 1346 of the apparatus 1302, for example.

In some aspects, the network node may be an SN, and the SN may receive a determined combined downlink throughput from the MN, as illustrated at 1210. The reception may be performed, e.g., by the reception component 1330 and/or the report component 1344 of the apparatus 1302, for example.

The SN may further receive, at 1202, a QoS monitoring request, where the SN provides the combined packet loss rate and Uu loss rate to the core network component in response to the QoS monitoring request. The reception may be performed, e.g., by the reception component 1330 and/or the request component 1346 of the apparatus 1302, for example.

FIG. 13 is a diagram 1300 illustrating an example of a hardware implementation for an apparatus 1302. The apparatus 1302 is an SN apparatus, and may be a base station, a component of a base station, or may implement base station functionality. The apparatus 1102 may include a baseband unit 1304. The baseband unit 1304 may communicate through a cellular RF transceiver with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the base station 310 and may include the memory 376 and/or at least one of the TX processor 316, the RX processor 370, and the controller/processor 375.

The communication manager 1332 includes a statistic measurement component 1342 configured to measure a data burst statistic for the network node, the data burst statistic being based on, or corresponds to, at least one of a burst level throughput or a packet loss measurement for a data burst between the UE and the MN based on a first bearer in the split bearer configuration or between the UE and the SN based on a second bearer in the split bearer configuration, e.g., as described in connection with 1204. The communication manager 1332 includes a data burst statistic component 1340 that provides a data burst statistic to an MN or a core network component, e.g., as described in connection with 1206 and 1208. The communication manager 1332 may further include a report component 1344 that receives the combined traffic verification statistic from the MN, e.g., as described in connection with 1210. The communication manager 1332 may further include a request component 1346 that receives an indication from the MN to provide the data burst statistic, e.g., as described in connection with 1202.

Figure 12:
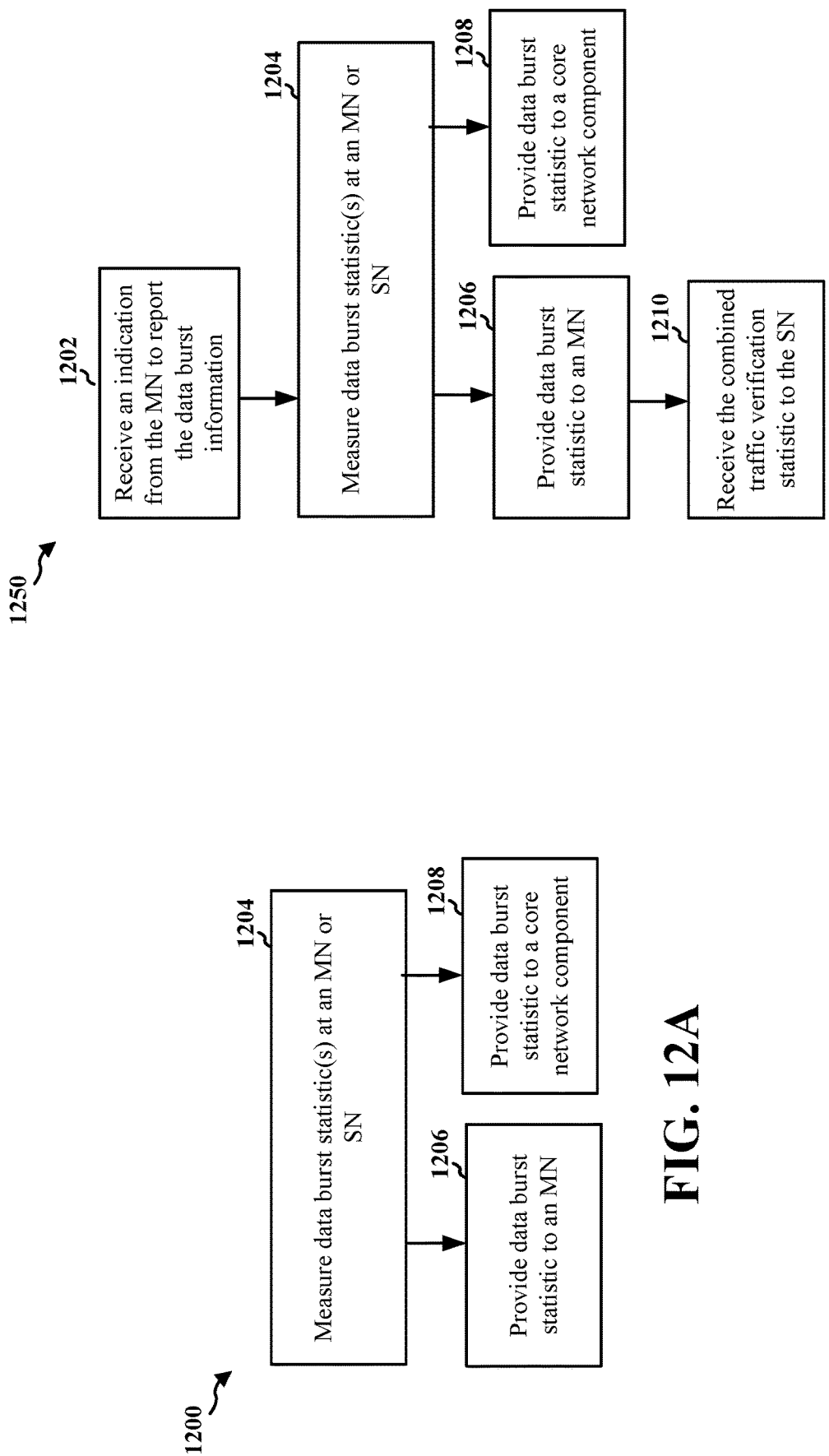
FIGS. 12A and 12B are flowcharts of methods of wireless communication.
Figure 13:
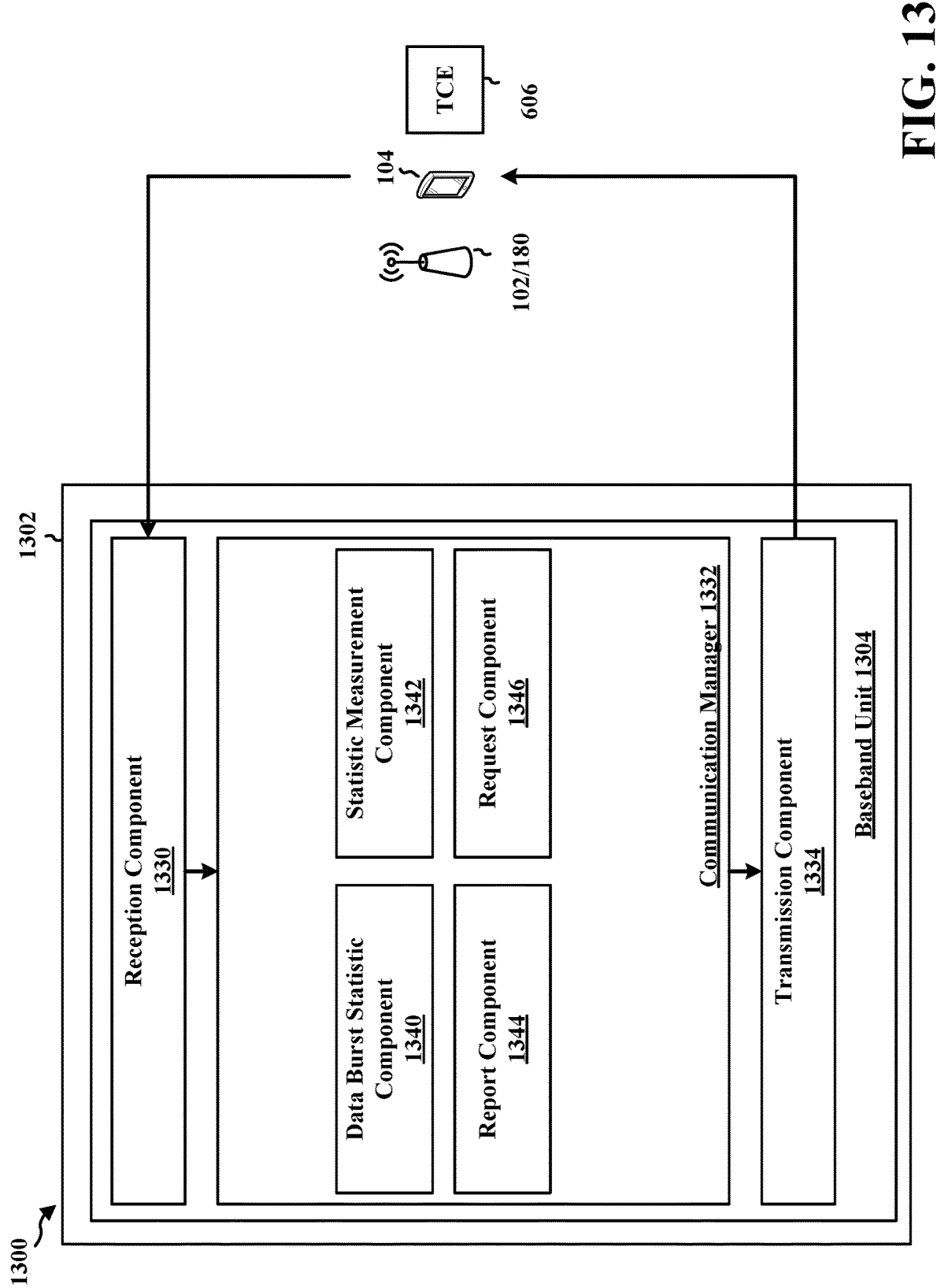
FIG. 13 is a diagram illustrating an example of a hardware implementation for an example apparatus.

The apparatus may include additional components that perform each of the blocks of the algorithm in the flowchart of FIG. 12 and/or the aspects performed by the SN in FIG. 6A or FIG. 6B. As such, each block in the flowchart of FIG. 12 and/or the aspects performed by the SN in FIG. 6A or FIG. 6B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, includes means for measuring, at a network node, a data burst statistic for the network node, the data burst statistic being based on at least one of a burst level throughput or a packet loss measurement for a data burst between the UE and the MN based on a first bearer in the split bearer configuration or between the UE and the SN based on a second bearer in the split bearer configuration; and means for providing the data burst statistic from the network node to at least one of a MN based on a second bearer or a core network component. The apparatus may include means for receiving an indication from the MN or the core network component to report data burst information for throughput, where the means for providing provide the data burst statistic based on the indication. The apparatus 1302 may further include means for receiving a determined combined downlink throughput from the MN. The apparatus may include means for receiving a QoS monitoring request, where the SN provides the combined packet loss rate and Uu loss rate to the core network component in response to the QoS monitoring request. The means may be one or more of the components of the apparatus 1302 configured to perform the functions recited by the means. As described supra, the apparatus 1302 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following example aspects are illustrative only and aspects thereof may be combined with aspects of other examples or teaching described herein, without limitation.

Aspect 1 is a method of wireless communication based on a split bearer configuration with an MN on a first bearer and an SN on a second bearer, comprising: receiving, at the MN, a data burst statistic from the SN; and providing, to a core network, a combined traffic verification statistic for the MN based on a first bearer and the SN based on a second bearer using the data burst statistic from the SN.

In aspect 2, the method of aspect 1 further includes determining a combined traffic verification statistic for the MN based on the first bearer and the SN based on the second bearer using the data burst statistic from the SN.

In aspect 3, the method of aspect 1 or aspect 2 further includes that the data burst statistic is received from the SN in at least one of: an X2 message, an Xn user plane message, a control plane message, or a downlink data delivery message.

In aspect 4, the method of any of aspects 1-3 further includes that the combined traffic verification statistic includes a combined downlink throughput for the MN based on the first bearer and the SN based on the second bearer.

In aspect 5, the method of any of aspects 1-4 further includes that the data burst statistic includes one or more of: an aggregation indication indicating traffic aggregation, or a duplication indication indicating traffic duplication.

In aspect 6, the method of any of aspects 1-5 further includes that the data burst statistic includes one or more of a data burst size, a start time of a data burst or a time associated with an end of the data burst.

In aspect 7, the method of any of aspects 1-6 further includes providing an indication to the SN to report data burst information for throughput, wherein the MN receives the data burst statistic based on the indication.

In aspect 8, the method of any of aspects 1-7 further includes providing the combined downlink throughput to the SN.

In aspect 9, the method of any of aspects 1-8 further includes that the combined downlink throughput includes a PDCP layer throughput for each radio bearer for individual RLC legs and for each UE.

In aspect 10, the method of any of aspects 1-9 further includes that the combined traffic verification statistic includes a combined packet drop rate and Uu loss rate for the MN based on the first bearer and the SN based on the second bearer.

In aspect 11, the method of any of aspects 1-10 further includes that the data burst statistic includes one or more of: a number of dropped RLC SDUs at the SN during a measurement period, or a number of RLC SDUs of which a part is transmitted at the SN during the measurement period.

In aspect 12, the method of any of aspects 1-11 further includes that the combined packet drop rate and the Uu loss rate determined by the MN indicates at least one of: a first number of RLC SDUs for which a part is transmitted over the air at the SN, a first sequence number of RLC SDU for which a part is transmitted over the air at the SN in a TCP SACK format, a second number of dropped RLC SDUs at a DU in a measurement period, or a second sequence number of RLC SDU dropped at the DU in the TCP SACK format.

In aspect 13, the method of any of aspects 1-12 further includes receiving a QoS monitoring request, wherein the MN provides the combined packet drop rate and the Uu loss rate to the core network component in response to the QoS monitoring request.

In aspect 14, the method of any of aspects 1-13 further includes that the combined traffic verification statistic includes a combined downlink throughput for traffic duplication based the MN using the first bearer and the SN using the second bearer.

In aspect 15, the method of any of aspects 1-14 further includes that the combined traffic verification statistic includes a combined uplink throughput for the MN based on the first bearer and the SN based on the second bearer.

In aspect 16, the method of aspect 15 further includes that the data burst statistic includes one or more of: an uplink data burst size for an uplink data burst, a start time of the uplink data burst, or an end time associated with an end of the uplink data burst.

Aspect 17 is an apparatus including memory and at least one processor coupled to the memory, the memory and the at least one processor being configured to implement a method as in any of aspects 1-16.

In aspect 18, the apparatus of aspect 17 further includes at least one antenna and a transceiver coupled to the at least one antenna and the at least one processor.

Aspect 19 is a system or apparatus including means for performing the method of any of aspects 1-16.

In aspect 20, the apparatus of aspect 19 further includes at least one antenna and a transceiver coupled to the at least one antenna.

Aspect 21 is a non-transitory computer readable medium storing instructions executable by one or more processors to cause the one or more processors to implement a method as in any of aspects 1-16.

Aspect 22 is a method of wireless communication at a network node having a split bearer configuration for at least one UE, comprising: measuring, at an MN or an SN, a data burst statistic for the network node, the data burst statistic being based on at least one of a burst level throughput or a packet loss measurement for a data burst between the UE and the MN based on a first bearer in the split bearer configuration or between the UE and the SN based on a second bearer in the split bearer configuration; and providing the data burst statistic from the network node to at least one of the MN or a core network component.

In aspect 23, the method of aspect 22 further includes that the network node is the MN and the memory and the at least one processor are configured to measure the data burst statistic for the MN based on the first bearer and provide the data burst statistic from the MN to the core network component.

In aspect 24, the method of aspect 22 further includes that the network node is the SN and the memory and the at least one processor are configured to measure the data burst statistic for the SN based on the second bearer and provide the data burst statistic from the SN to the core network component.

In aspect 25, the method of any of aspects 22-24 further includes that the data burst statistic includes one or more of: an aggregation indication indicating traffic aggregation, or a duplication indication indicating traffic duplication.

In aspect 26, the method of any of aspects 22-25 further includes that the data burst statistic includes one or more of: a data burst size, a start time of the data burst, or a time associated with an end of the data burst.

In aspect 27, the method of any of aspects 22-26 further includes receiving an indication from the MN or the core network component to report data burst information for throughput, wherein the network node provides the data burst statistic based on the indication.

In aspect 28, the method of any of aspects 22-27 further includes that the data burst statistic includes one or more of: a number of dropped RLC SDUs at the MN or the SN during a measurement period, a number of RLC SDUs of which a part is transmitted at the MN or the SN during the measurement period, a first number of RLC SDUs for which a part is transmitted over the air at the MN or the SN, a first sequence number of RLC SDU for which the part is transmitted over the air at the MN or the SN in a TCP SACK format, a second number of dropped RLC SDUs at a DU in the measurement period, or a second sequence number of RLC SDU dropped at the DU in the TCP SACK format.

In aspect 29, the method of any of aspects 22-28 further includes that the data burst statistic includes one or more of: an uplink data burst size of an uplink data burst, a start time of the uplink data burst, or an end time associated with an end of the uplink data burst.

In aspect 30, the method of any of aspects 22-29 further includes providing the data burst statistic in at least one of: an X2 message, an Xn user plane message, a control plane message, or a downlink data delivery message.

In aspect 31, the method of any of aspects 22-23 or 25-30 further includes transmitting a combined downlink throughput from the MN to the SN.

In aspect 32, the method of any of aspects 22 or 24-30 further includes the network node is the SN, the method further including measuring the data burst statistic for the SN based on the second bearer and providing the data burst statistic from the SN to the MN based on the first bearer.

In aspect 33, the method of aspect 32 further includes receiving, at the SN, a combined downlink throughput from the MN.

In aspect 34, the method of aspect 32 or 33 further includes providing the data burst statistic from the SN to the MN for determination of at least one of a combined packet drop rate, a combined Uu loss rate, a combined downlink throughput, or a combined uplink throughput for the MN based on the first bearer and the SN based on the second bearer.

In aspect 35, the method of any of aspects 32-24 further includes receiving a QoS monitoring request and providing the combined packet loss rate and Uu loss rate from the SN to the core network component in response to the QoS monitoring request.

Aspect 36 is an apparatus including memory and at least one processor coupled to the memory, the memory and the at least one processor being configured to implement a method as in any of aspects 22-35.

In aspect 37, the apparatus of aspect 36 further includes at least one antenna and a transceiver coupled to the at least one antenna and the at least one processor.

Aspect 38 is a system or apparatus including means for performing the method of any of aspects 22-35.

In aspect 39, the apparatus of aspect 38 further includes at least one antenna and a transceiver coupled to the at least one antenna.

Aspect 40 is a non-transitory computer readable medium storing instructions executable by one or more processors to cause the one or more processors to implement a method as in any of aspects 22-35.

Aspect 41 is a method of wireless communication, comprising: determining, at an SN, a data burst statistic for the SN based on a first bearer; and providing the data burst statistic from the SN to at least one of an MN based on a second bearer or a core network component.

In aspect 42, the method of aspect 41 further includes that the SN provides the data burst statistic in at least one of: an X2 message, an Xn user plane message, a control plane message, or a downlink data delivery message.

In aspect 43, the method of aspect 41 or aspect 42 further includes that the SN provides the data burst statistic to the MN for determination of a combined downlink throughput for the MN based on the first bearer and the SN based on the second bearer.

In aspect 44, the method of any of aspects 41-43 further includes that the data burst statistic includes one or more of: a data burst size, a start time of a data burst, a time associated with an end of the data burst, an aggregation indication indicating traffic aggregation, or a duplication indication indicating traffic duplication.

In aspect 45, the method of any of aspects 41-44 further includes receiving an indication from the MN or the core network component to report data burst information for throughput, wherein the SN provides the data burst statistic based on the indication.

In aspect 46, the method of any of aspects 41-45 further includes receiving a determined combined downlink throughput from the MN.

In aspect 47, the method of any of aspects 41-46 further includes that the SN provides the data burst statistic to the MN for determination of a combined packet drop rate and Uu loss rate for the MN based on the first bearer and the SN based on the second bearer.

In aspect 48, the method of any of aspects 41-47 further includes that the data burst statistic includes one or more of: a number of dropped RLC SDUs at the SN during a measurement period, a number of RLC SDUs of which a part is transmitted at the SN during the measurement period, a first number of RLC SDUs for which a part is transmitted over the air at the SN, a first sequence number of RLC SDU for which a part is transmitted over the air at the SN in a TCP SACK format, a second number of dropped RLC SDUs at a DU in a measurement period, or a second sequence number of RLC SDU dropped at the DU in the TCP SACK format.

In aspect 49, the method of any of aspects 41-48 further includes receiving a QoS monitoring request, wherein the SN provides the combined packet loss rate and Uu loss rate to the core network component in response to the QoS monitoring request.

In aspect 50, the method of any of aspects 41-49 further includes that the SN provides the data burst statistic to the MN for determination of a combined uplink throughput for the MN based on the first bearer and the SN based on the second bearer.

In aspect 51, the method of any of aspects 41-50 further includes that the data burst statistic includes one or more of: an uplink data burst size of an uplink data burst, a start time of the uplink data burst, or an end time associated with an end of the uplink data burst.

Aspect 52 is an apparatus including memory and at least one processor coupled to the memory, the memory and the at least one processor being configured to implement a method as in any of aspects 41-51.

In aspect 53, the apparatus of aspect 52 further includes at least one antenna and a transceiver coupled to the at least one antenna and the at least one processor.

Aspect 54 is a system or apparatus including means for performing the method of any of aspects 41-51.

In aspect 55, the apparatus of aspect 54 further includes at least one antenna and a transceiver coupled to the at least one antenna.

Aspect 56 is a non-transitory computer readable medium storing instructions executable by one or more processors to cause the one or more processors to implement a method as in any of aspects 41-51.

What is claimed is:

1. A first network node associated with a split bearer configuration for a user equipment (UE), comprising:
a memory; and
at least one processor coupled to the memory, wherein the first network node is configured to:
measure, a first data burst statistic for a first data burst between the UE and the first network node, wherein the first data burst statistic is based on a first burst level throughput and a first packet loss measurement for the first data burst based on a first bearer in the split bearer configuration;
receive, from a second network node, a second data burst statistic for a second data burst between the UE and the second network node, wherein the first network node is a primary node (MN) and the second network node is a secondary node (SN), and wherein the second data burst statistic is based on a second burst level throughput for the second data burst and a second packet loss measurement for the second data burst, wherein the second data burst statistic includes: a start time and an end time for the second data burst, and at least one of a respective first sequence number for at least one radio link control (RLC) service data unit (SDU) that is transmitted, or a respective second sequence number for at least one RLC SDU that is dropped; and
provide, to a core network component, a report, wherein the report is based on the first data burst statistic and the second data burst statistic and includes a combined downlink throughput based on a first data burst throughput statistic between the first network node and the UE and a second data burst throughput statistic between the second network node and the UE.

2. The first network node of claim 1, wherein the first data burst statistic or the second data burst statistic includes one or more of:
an aggregation indication indicating traffic aggregation, or
a duplication indication indicating traffic duplication.

3. The first network node of claim 1, wherein the first data burst statistic or the second data burst statistic further includes one or more of:
a respective data burst size,
a respective start time for the first data burst or the second data burst, wherein the respective start time of the second data burst is the start time for the second data burst, or
a respective end time for the first data burst or the second data burst, wherein the respective end time of the second data burst is the end time for the second data burst.

4. The first network node of claim 1, wherein the first network node is configured to:
transmit an indication to the second network node for reporting the second data burst statistic.

5. The first network node of claim 1, wherein the first data burst statistic or the second data burst statistic includes one or more of:
a respective number of dropped RLC SDUs during a measurement period,
a respective number of RLC SDUs of which a part is transmitted during the measurement period,
a respective first number of RLC SDUs for which the part is transmitted over the air,
the respective first sequence number of the at least one RLC SDU for which the part is transmitted over the air in a TCP SACK format,
a respective second number of dropped RLC SDUs at a distributed unit (DU) in the measurement period, or
the respective second sequence number of the at least one RLC SDU dropped at the DU in the TCP SACK format.

6. The first network node of claim 1, wherein the first data burst and the second data burst are overlapping in time.

7. The first network node of claim 1, wherein, to provide the report, the first network node is configured to provide the report in at least one of:
an X2 message,
an Xn user plane message,
a control plane message, or
a downlink data delivery message.

8. The first network node of claim 1, wherein the first network node is configured to:
- determine, based on the first data burst statistic and the second data burst statistic, at least one of a combined packet drop rate, a combined Uu loss rate, the combined downlink throughput, or a combined uplink throughput, and
- wherein the report comprises a combined traffic verification statistic based on the at least one of the combined packet drop rate, the combined Uu loss rate, the combined downlink throughput, or the combined uplink throughput.

9. The first network node of claim 8, wherein the first network node is configured to:
- receive a quality of service (QoS) monitoring request, and
- wherein the report comprises the combined packet loss rate and the combined Uu loss rate in response to the QoS monitoring request.

10. The first network node of claim 1, wherein the report comprises the first data burst statistic and the second data burst statistic.

11. A method of wireless communication performed by a first network node having a split bearer configuration for a user equipment (UE), comprising:
- measuring, a first data burst statistic for a first data burst between the UE and the first network node, wherein the first data burst statistic is based on a first burst level throughput and a first packet loss measurement for the first data burst based on a first bearer in the split bearer configuration;
- receiving, from a second network node, a second data burst statistic for a second data burst between the UE and the second network node, wherein the first network node is a primary node (MN) and the second network node is a secondary node (SN), and
- wherein the second data burst statistic is based on a second burst level throughput for the second data burst and a second packet loss measurement for the second data burst, wherein the second data burst statistic includes: a start time and an end time for the second data burst, and at least one of a respective first sequence number for at least one radio link control (RLC) service data unit (SDU) that is transmitted, or a respective second sequence number for at least one RLC SDU that is dropped; and
- providing, to a core network component, a report, wherein the report is based on the first data burst statistic and the second data burst statistic and includes a combined downlink throughput based on a first data burst throughput statistic between the first network node and the UE and a second data burst throughput statistic between the second network node and the UE.

12. The method of claim 11, wherein the first data burst statistic or the second data burst statistic includes one or more of:
- an aggregation indication indicating traffic aggregation, or
- a duplication indication indicating traffic duplication.

13. The method of claim 11, wherein the first data burst statistic or the second data burst statistic further includes one or more of:
- a respective data burst size,
- a respective start time for the first data burst or the second data burst, wherein the respective start time of the second data burst is the start time for the second data burst, or
- a respective end time for the first data burst or the second data burst, wherein the respective end time of the second data burst is the end time for the second data burst.

14. The method of claim 11, further comprising:
- transmitting an indication to the second network node for reporting the second data burst statistic.

15. The method of claim 11, wherein the first data burst statistic or the second data burst statistic includes one or more of:
- a respective number of dropped RLC SDUs during a measurement period,
- a respective number of RLC SDUs of which a part is transmitted during the measurement period,
- a respective first number of RLC SDUs for which the part is transmitted over the air,
- the respective first sequence number of the at least one RLC SDU for which the part is transmitted over the air in a TCP SACK format,
- a respective second number of dropped RLC SDUs at a distributed unit (DU) in the measurement period, or
- the respective second sequence number of the at least one RLC SDU dropped at the DU in the TCP SACK format.

16. The method of claim 11, further comprising:
- receiving, from the second network node, the combined downlink throughput based on the first data burst and the second data burst.

17. The method of claim 11, further comprising:
- determining, based on the first data burst statistic and the second data burst statistic, at least one of a combined packet drop rate, a combined Uu loss rate, the combined downlink throughput, or a combined uplink throughput, and
- wherein the report comprises a combined traffic verification statistic based on the at least one of the combined packet drop rate, the combined Uu loss rate, the combined downlink throughput, or the combined uplink throughput.

18. The method of claim 17, further comprising:
- receiving a quality of service (QoS) monitoring request, and wherein the report comprises the combined packet drop rate and the combined Uu loss rate in response to the QoS monitoring request.

19. The method of claim 11, wherein the report comprises the first data burst statistic and the second data burst statistic.

20. The first network node of claim 1, wherein the second data burst statistic is further based on the second burst level throughput and includes the start time and the end time for the second data burst.

21. The first network node of claim 1, wherein the second data burst statistic includes the respective first sequence number for the at least one RLC SDU that is transmitted.

22. The first network node of claim 1, wherein the second data burst statistic includes the respective second sequence number for the at least one RLC SDU that is dropped.

23. The method of claim 11, wherein the second data burst statistic is further based on the second burst level throughput and includes the start time and the end time for the second data burst.

24. The method of claim 11, wherein the second data burst statistic includes the respective first sequence number for the at least one RLC SDU that is transmitted.

25. The method of claim 11, wherein the second data burst statistic includes the respective second sequence number for the at least one RLC SDU that is dropped.

26. The first network node of claim 1, wherein the report comprises a combined throughput or a combined packet loss measurement based on a combination of the first data burst statistic and the second data burst statistic.

27. The method of claim 11, wherein the report comprises a combined packet loss measurement based on a combination of the first data burst statistic and the second data burst statistic.

* * * * *